(12) United States Patent
Kim et al.

(10) Patent No.: US 11,808,960 B2
(45) Date of Patent: *Nov. 7, 2023

(54) COLOR FILTERS AND DEVICES INCLUDING THE SAME

(71) Applicant: SAMSUNG ELECTRONICS CO., LTD., Suwon-si (KR)

(72) Inventors: Tae Gon Kim, Hwaseong-si (KR); Shang Hyeun Park, Yongin-si (KR); Shin Ae Jun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,257

(22) Filed: Dec. 9, 2021

(65) Prior Publication Data

US 2022/0179139 A1    Jun. 9, 2022

(30) Foreign Application Priority Data

Dec. 9, 2020 (KR) .................. 10-2020-0171346

(51) Int. Cl.
*G02B 5/20* (2006.01)
*G02F 1/017* (2006.01)
(Continued)

(52) U.S. Cl.
CPC .......... *G02B 5/207* (2013.01); *C01G 9/08* (2013.01); *C01G 15/006* (2013.01); *C09K 11/70* (2013.01);
(Continued)

(58) Field of Classification Search
CPC .......... G02B 2/207; G02B 2207/101; G02F 1/01791; C01G 9/08; C01G 15/006; C09K 11/70; C09K 11/883; B82Y 20/00
See application file for complete search history.

(56) References Cited

U.S. PATENT DOCUMENTS 10,158,054 B1   12/2018   Lin et al.
10,170,648 B2    1/2019   Jun et al.
(Continued)

FOREIGN PATENT DOCUMENTS

CN   109642149 A    4/2019
EP   3228640 A1   10/2017
(Continued)

OTHER PUBLICATIONS

Extended European Search Report dated Apr. 29, 2022, of the corresponding European Patent Application No. 21213333.4.
(Continued)

*Primary Examiner* — Bijan Ahvazi
(74) *Attorney, Agent, or Firm* — CANTOR COLBURN LLP

(57) ABSTRACT

A color filter including a first pixel (or color conversion region) that is configured to emit a first light and a display device including the color filter. The first pixel includes a (first) quantum dot composite (or a color conversion layer including the quantum dot composite), wherein the quantum dot composite may include a matrix and a plurality of quantum dots dispersed (e.g., randomly) in the matrix, wherein the plurality of the quantum dots exhibit a multi-modal distribution (e.g., a bimodal distribution) including a first peak particle size and a second peak particle size in a size analysis, wherein the second peak particle size is greater than the first peak particle size, and a difference between the first peak particle size and the second peak particle size is less than or equal to about 5 nanometers (nm) (e.g., less than or equal to about 4.5 nm).

19 Claims, 16 Drawing Sheets

(51) Int. Cl.
  *C01G 15/00* (2006.01)
  *C01G 9/08* (2006.01)
  *C09K 11/70* (2006.01)
  *C09K 11/88* (2006.01)
  *B82Y 20/00* (2011.01)
  *B82Y 30/00* (2011.01)
  *B82Y 40/00* (2011.01)

(52) U.S. Cl.
  CPC ........ *C09K 11/883* (2013.01); *G02F 1/01791* (2021.01); *B82Y 20/00* (2013.01); *B82Y 30/00* (2013.01); *B82Y 40/00* (2013.01); *C01P 2004/64* (2013.01); *C01P 2004/80* (2013.01); *C01P 2006/60* (2013.01); *G02B 2207/101* (2013.01)

(56) References Cited

U.S. PATENT DOCUMENTS

| | | | |
|---|---|---|---|
| 10,950,741 | B2 | 3/2021 | Jun et al. |
| 2008/0230764 | A1 | 9/2008 | Burt |
| 2010/0051898 | A1 | 3/2010 | Kim et al. |
| 2011/0240960 | A1 | 10/2011 | Kim et al. |
| 2013/0146838 | A1 | 6/2013 | Ku et al. |
| 2013/0308334 | A1* | 11/2013 | Davis ............... D04H 1/43838 362/556 |
| 2014/0230992 | A1 | 8/2014 | Kim et al. |
| 2017/0306227 | A1 | 10/2017 | Ippen et al. |
| 2017/0327737 | A1* | 11/2017 | Yamaki ............... C09K 11/02 |
| 2018/0119007 | A1 | 5/2018 | Ippen et al. |
| 2018/0327665 | A1 | 11/2018 | Lee et al. |
| 2020/0024512 | A1 | 1/2020 | Min et al. |
| 2020/0172806 | A1 | 6/2020 | Park et al. |
| 2020/0407627 | A1 | 12/2020 | Zhou et al. |
| 2021/0167228 | A1 | 6/2021 | Jun et al. |

FOREIGN PATENT DOCUMENTS

| | | | |
|---|---|---|---|
| JP | 2015529698 | A | 10/2015 |
| JP | 2019021890 | A | 2/2019 |
| KR | 20100027892 | A | 3/2010 |
| KR | 20130065320 | A | 6/2013 |
| KR | 101537296 | B1 | 7/2015 |
| KR | 20150134926 | A | 12/2015 |
| KR | 101687086 | B1 | 12/2016 |
| KR | 20170059597 | A | 5/2017 |
| KR | 101774775 | B1 | 9/2017 |
| KR | 20180108012 | A | 10/2018 |
| KR | 20180124765 | A | 11/2018 |
| KR | 20190059208 | A | 5/2019 |
| KR | 20200003209 | A | 1/2020 |
| KR | 20200011029 | A | 1/2020 |
| WO | 2006054402 | A1 | 5/2006 |

OTHER PUBLICATIONS

Sang Hyeon Lee et al., "The effects of discrete and gradient mid-shell structures on the photoluminescence of single InP quantum dots," Nanoscale, Nov. 5, 2019, pp. 23251-23258, vol. 11.

Hung Chia Wang et al., "Cadmium-Free InP/ZnSeS/ZnS Heterostructure-Based Quantum Dot Light-Emitting Diodes with a ZnMgO Electron Transport Layer and a Brightness of Over 10 000 cd m-2," advanced science news, 2017, pp. 1-7, vol. 13, Issue 1603962.

Jung-Ho Jo et al., InP-Based Quantum Dots Having an InP Core, Composition-Gradient ZnSeS Inner Shell, and ZnS Outer Shell with Sharp, Bright Emissivity, and Blue Absorptivity for Display Devices, ACS Applied Nano Materials 2020, 3, 2, 1972-1980 (Year: 2020).

Non-Final Office Action dated Jul. 7, 2023 in U.S. Appl. No. 17/546,268.

Yongwook Kim et al., Bright and Uniform Green Light Emitting InP/ZnSe/ZnS Quantum Dots for Wide Color Gamut Displays, ACS Appl. Nano Mater. 2019, 2, 1496-1504. (Year: 2019).

\* cited by examiner

Pattern Preparation by using a photoresist

Repeat pattern making three times

COLOR FILTERS AND DEVICES INCLUDING THE SAME

CROSS-REFERENCE TO RELATED APPLICATION

This application claims priority to Korean Patent Application No. 10-2020-0171346 filed in the Korean Intellectual Property Office on Dec. 9, 2020, and all the benefits accruing therefrom under 35 U.S.C. § 119, the content of which in its entirety is incorporated herein by reference.

BACKGROUND

1. Field

A color filter including a quantum dot, and a display device including the same are disclosed.

2. Description of the Related Art

A quantum dot (i.e., a nano-sized semiconductor nanocrystal) may have a bandgap energy varying with particle size and composition of the nanocrystal. The quantum dot may exhibit electroluminescence and photoluminescence properties. Luminescence properties of the quantum dot are based on a quantum confinement effect and thus may be used in many commercial applications, such as a display device or the like.

SUMMARY

An embodiment provides a color filter that can realize, e.g., exhibit, improved optical properties.

An embodiment provides a display device including the color filter.

In an embodiment, a color filter includes a first pixel (e.g., a first subpixel or a first color conversion region) that is configured to emit a first light, wherein the first pixel include a (first) quantum dot composite (or a color conversion layer including the quantum dot composite), wherein the quantum dot composite may include a matrix and a plurality of quantum dots dispersed (e.g., randomly) in the matrix, wherein the plurality of the quantum dots exhibit a multi-modal distribution (e.g., a bimodal distribution) including a first peak particle size and a second peak particle size in a size analysis, wherein the second peak particle size is greater than the first peak particle size, and a difference between the first peak particle size and the second peak particle size is less than or equal to about 5 nanometers (nm) (e.g., less than or equal to about 4.5 nm). The first pixel (or the quantum dot composite or the plurality of the quantum dots) may be configured to emit green light (e.g., by photo-excitation).

The color filter may further include a second pixel (e.g., a second subpixel or a second color conversion region, hereinafter, "second pixel"), wherein the second pixel is configured to emit a second light different from the first light and includes a (second) quantum dot composite. A partition wall (e.g., a black matrix) may be provided between the first pixel and the second pixel for example for an optical isolation for each pixel.

The green light may have a luminescent peak wavelength of greater than or equal to about 500 nm.

The green light may have a luminescent peak wavelength of less than or equal to about 550 nm.

The quantum dot composite may be configured to exhibit a photoconversion of greater than or equal to about 30% upon excitation with light having a wavelength of about 465 nm. The quantum dot composite may be configured to exhibit a photoconversion of greater than or equal to about 30% at an excitation by light having a wavelength of about 450 nm.

The quantum dot composite may have a photoconversion of greater than or equal to about 30% for example, at a temperature of 80° C.

A photoluminescent peak wavelength of the plurality of the quantum dots may be present in a range of greater than or equal to about 490 nm and less than or equal to about 580 nm or from about 500 nm to about 550 nm.

An ultraviolet-visible absorption spectrum curve of the quantum dot composite may exhibit a positive differential coefficient value (i.e., tangential slope) at a wavelength of 450 nm.

The differential coefficient value may be greater than or equal to about 0.001, or greater than or equal to about 0.01.

The plurality of the quantum dots may have a core shell structure.

The quantum dot(s) or the core shell structure may include a semiconductor nanocrystal core including indium (In) and phosphorus (P), and optionally zinc (Zn), and a semiconductor nanocrystal shell disposed on the semiconductor nanocrystal core, the semiconductor nanocrystal shell including zinc, selenium, and sulfur.

The plurality of the quantum dots may not include cadmium.

In an UV-Vis absorption spectrum of the quantum dot composite, a valley depth (VD) defined by the following equation may be greater than or equal to about 0.2, greater than or equal to about 0.25, greater than or equal to about 0.27, greater than or equal to about 0.28, greater than or equal to about 0.29, or greater than or equal to about 0.3:

$$1-(\text{Abs}_{valley}/\text{Abs}_{first})=\text{VD}$$

wherein, $\text{Abs}_{first}$ is an absorption at a first absorption peak, and $\text{Abs}_{valley}$ is an absorption at a lowest point of a valley adjacent to the first absorption peak.

A difference between the first peak particle size and the second peak particle size may be greater than or equal to about 0.5 nm, greater than or equal to about 1 nm, or greater than or equal to about 1.5 nm. A difference between the first peak particle size and the second peak particle size may be less than or equal to about 4 nm, less than or equal to about 3.5 nm, less than or equal to about 3 nm, less than or equal to about 2.5 nm, or less than or equal to about 2 nm.

The first peak particle size may be greater than or equal to about 3.5 nm, or greater than or equal to about 4 nm.

The second peak particle size may be greater than or equal to about 5 nm, or greater than or equal to about 6 nm.

A ratio (e.g., bimodal ratio) of a frequency value (e.g., second mode) of the second peak particle size to a frequency value (e.g., first mode) of the first peak particle size may be greater than or equal to about 0.1:1, greater than or equal to about 0.15:1, greater than or equal to about 0.3:1, or greater than or equal to about 0.5:1. The frequency value may be the number of given particles.

A ratio of a frequency value of the second peak particle size to a frequency value of the first peak particle size may be less than or equal to about 1:1, less than or equal to about 0.8:1, less than or equal to about 0.6:1, less than or equal to about 0.5:1, or less than or equal to about 0.4:1.

A frequency value of the first peak particle size may be greater than a frequency value of the second peak particle size.

A frequency value of the first peak particle size may be less than a frequency value of the second peak particle size.

In the color filter, the quantum dot composite may exhibit a light absorption of greater than or equal to about 80%, greater than or equal to about 85%, greater than or equal to about 88%, or greater than or equal to about 90% for incident light having a wavelength of about 465 nm.

In the color filter, the quantum dot composite may exhibit a light absorption of greater than or equal to about 87.5%, greater than or equal to about 88%, greater than or equal to about 90%, or greater than or equal to about 90.5% for incident light having a wavelength of about 450 nm.

A photoluminescent peak of the quantum dot composite may have a full width at half maximum of less than or equal to about 43 nm, or less than or equal to about 40 nm.

The quantum dot composite may be configured to emit a green light when being provided, e.g., irradiated, with incident light having a wavelength of about 465 nm or a wavelength of about 450 nm, wherein the green light has a photoluminescent peak with a tail percentage of less than or equal to about 16%, or less than or equal to about 15%. The tail percentage refers to a percentage of a tail wavelength area (for example, an area of a photoluminescent peak at a wavelength greater than the tail wavelength such as about 580 nm) with respect to a total area of the photoluminescent spectrum (of a given light).

In a photoluminescence excitation (PLE) spectroscopy analysis of the quantum dot composite, a difference between a first peak valley depth of a photoluminescent excitation spectrum at a wavelength of about 560 nm and a first peak valley depth of a photoluminescent excitation spectrum at a wavelength of about 510 nm may be greater than or equal to about 0.15. The first peak valley depth is a depth of a valley adjacent to a first peak in a PLE spectrum and the first peak is a main peak appearing at the longest wavelength in the PLE spectrum, and the first peak valley depth is calculated by the following equation:

$$1-(PLE_{valley}/PLE_{first})=VD_{PLE}$$

wherein $PLE_{first}$ is a luminance value at a first peak in the PLE spectrum and $PLE_{valley}$ is a luminance value at the lowest point of a valley adjacent to the first peak.

In a photoluminescence excitation spectroscopy analysis of the quantum dot composite, a difference between a first peak valley depth of a photoluminescent excitation spectrum at a wavelength of about 560 nm and a first peak valley depth of a photoluminescent excitation spectrum at a wavelength of about 510 nm may be greater than or equal to about 0.20.

The matrix may include a linear polymer, a crosslinked polymer, or a combination thereof.

In an embodiment, a display device includes the aforementioned color filter.

The display device may further include a light source that is configured to provide the color filter with incident light.

The incident light may have a luminescent peak wavelength of about 440 nm to about 465 nm, or about 450 nm to about 460 nm.

An embodiment is related to an electronic apparatus including the aforementioned color filter or the aforementioned display device.

The electronic apparatus may include or may be a television (TV) set, a monitor, a mobile device, a virtual reality (VR)/augmented reality (AR) device, a display device for an electronic vehicle, or a combination thereof.

In an embodiment, a population of quantum dots includes a plurality of first quantum dots, the first quantum dots including a core including InZnP, a first shell including ZnSeS, and a second shell including ZnS; and a plurality of second quantum dots, the second quantum dots including a core including InZnP, and a first shell including ZnSe and a second shell including ZnS, wherein a size (e.g., an average size) of the plurality of first quantum dots is greater than or equal to about 4 nanometers and less than or equal to about 7 nanometers, a size (e.g., an average size) of the plurality of second quantum dots is greater than or equal to about 6 nanometers and less than or equal to about 10 nanometers, a difference between the (average) size of the plurality of first quantum dots and the (average) size of the plurality of second quantum dots is greater than or equal to about 0.5 nanometers and less than or equal to about 4 nanometers, and a weight ratio between the plurality of first quantum dots and the plurality of second quantum dots is from about 5:95 to about 95:5, from about 10:90 to about 90:10, from about 15:85 to about 85:15, from about 20:80 to about 80:20, from about 25:75 to about 75:25, from about 30:70 to about 70:30, from about 35:65 to about 65:35, from about 40:60 to about 60:40, from about 45:55 to about 55:45, about 50: about 50, or a combination thereof.

The luminescent type color filter according to an embodiment may achieve an improved incident light absorption and an enhanced photoconversion efficiency, reducing or minimizing a light loss in a display device. In an embodiment, the luminescent type color filter may contribute to improving a color reproducibility, a color purity, or a combination thereof of a device including the same. In an embodiment, the luminescent type color filter may realize, e.g., exhibit, increased luminescent intensity (e.g., photoluminescent intensity). A mixture of quantum dots having the distribution included in the luminescent type color filter of an embodiment may form an organic composition (e.g., a photoresist composition or an ink composition including a monomer combination, a polymer, or a combination thereof) with a desired level of viscosity, thus providing an improved processability.

The luminescent type color filter of an embodiment may be utilized in a display device (optionally having a liquid crystal layer) including a blue light source, for example, a blue light emitting organic light emitting diode (OLED), a blue light emitting micro light emitting diode (LED), a blue LED, or a combination thereof.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1A:
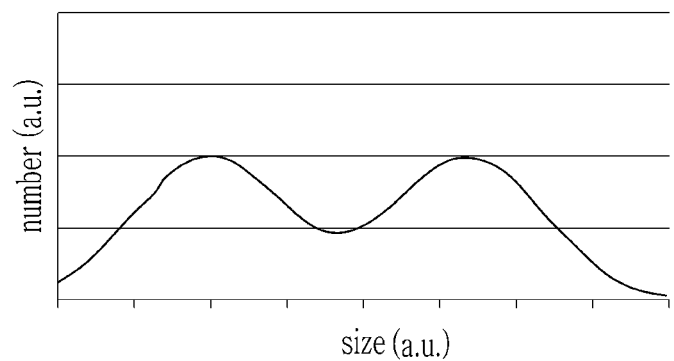
FIG. 1A is a graph of number (arbitrary units (a.u.)) versus size (a.u.) showing a size distribution (e.g., a bimodal distribution) of the quantum dots included in a quantum dot composite of a color filter according to an embodiment.

Advantages and characteristics of this disclosure, and a method for achieving the same, will become evident referring to the following example embodiments together with the drawings attached hereto. However, the embodiments should not be construed as being limited to the embodiments set forth herein. Rather, these embodiments are provided so that this disclosure will be thorough and complete, and will fully convey the scope of the invention to those skilled in the art.

Unless otherwise defined, all terms (including technical and scientific terms) in the specification may be defined as commonly understood by one skilled in the art to which this disclosure belongs. It will be further understood that terms, such as those defined in a generally-used dictionary should be interpreted as having a meaning that is consistent with their meaning in the context of the relevant art and the present disclosure, and will not be interpreted ideally or exaggeratedly unless expressly so defined.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the singular forms "a," "an," and "the" are intended to include the plural forms, including "at least one," unless the context clearly indicates otherwise. "At least one" is not to be construed as limiting "a" or "an." "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer, or section without departing from the teachings herein.

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within ±10% or ±5% of the stated value.

As used herein, when a definition is not otherwise provided, "substituted" refers to replacement of hydrogen of a compound by a substituent such as a C1 to C30 alkyl group, a C2 to C30 alkenyl group, a C2 to C30 alkynyl group, a C6 to C30 aryl group, a C7 to C30 alkylaryl group, a 01 to C30 alkoxy group, a C1 to C30 heteroalkyl group, a C3 to C30 heteroalkylaryl group, a C3 to C30 cycloalkyl group, a C3 to C30 cycloalkenyl group, a C3 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino or amine group (—NRR' wherein R and R' are independently hydrogen or a C1 to C6 alkyl group), an azido group (—N$_3$), an amidino group (—O(=NH)NH$_2$), a hydrazino group (—NHNH$_2$), a hydrazono group (=N(NH$_2$)), an aldehyde group (—O(=O)H), a carbamoyl group —C(O)NH$_2$), a thiol group (—SH), an ester group (—O(=O)OR, wherein R is a 01 to C6 alkyl group or a C6 to C12 aryl group), a carboxyl group (—COOH) or a salt thereof (—O(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

As used herein, when a definition is not otherwise provided, the prefix "hetero" refers to inclusion of a, e.g., at least one (for example, one to three), heteroatom of N, O, S, Si, or P.

As used herein, when a definition is not otherwise provided, "aliphatic" refers to a C1 to C30 linear or branched alkyl group, a C2 to C30 linear or branched alkenyl group, or a C2 to C30 linear or branched alkynyl group, "aromatic" refers to a C6 to C30 aryl group or a C2 to C30 heteroaryl group.

As used herein, when a definition is not otherwise provided, "(meth)acrylate" refers to acrylate, methacrylate, or a combination thereof.

As used herein, the term light conversion efficiency refers to a ratio of a light emission dose relative to an absorbed light dose of a quantum dot polymer composite from excitation light (i.e., blue light). As used herein, the term light conversion refers to a ratio of a light emission dose relative to a light dose of the excitation or incident light.

In order to obtain light conversion efficiency and light conversion, a total light dose, (B), of excitation light (i.e., an incident light) is measured, and then the PL spectrum of the quantum dot polymer composite film with using the excitation light is obtained, from the PL spectrum, a dose (A) of light in a green or red wavelength emitted from the quantum dot polymer composite film and a dose (B') of excitation light passing the quantum dot polymer composite film are obtained to calculate a light conversion, a blue light absorption, and a light conversion efficiency based on the following equations:

$$A/B \times 100\% = \text{light conversion (\%)}$$

$$A/(B-B') \times 100\% = \text{light conversion efficiency (\%)}$$

$$(B-B')/B \times 100\% = \text{blue light absorption (\%) of single film.}$$

As used herein, the term "Group" may refer to a group of Periodic Table.

As used herein, "Group I" refers to Group IA and Group IB, and includes Li, Na, K, Rb, or Cs, but is not limited thereto.

As used herein, "Group II" refers to Group IIA and Group IIB, and examples of Group II metal may be Cd, Zn, Hg, and Mg, but are not limited thereto.

As used herein, "Group III" refers to Group IIIA and Group IIIB, and examples of Group III metal may be Al, In, Ga, and TI, but are not limited thereto.

As used herein, "Group IV" refers to Group IVA and Group IVB, and examples of a Group IV metal may be Si, Ge, and Sn, but are not limited thereto. As used herein, the term "metal" includes a semi-metal such as Si.

As used herein, "Group V" may refer to Group VA, and examples thereof may include nitrogen, phosphorus, arsenic, antimony, and bismuth, but are not limited thereto.

As used herein, "Group VI" may refer to Group VIA, and examples thereof may include sulfur, selenium, and tellurium, but are not limited thereto.

As used herein, "first absorption peak wavelength" refers to a wavelength of the first main peak appearing in the lowest energy region in an ultraviolet-visible absorption spectrum.

Unless recited to the contrary, a "ratio" between chemical elements may refer to a mole ratio.

As used herein, a dimension (e.g., a size, a diameter, or a thickness, or the like) may be for a single quantum dot or a (e.g., a mean or a median) average value for quantum dots or a population of the quantum dots. The term "average" (e.g., an average size of the quantum dot) may be mean or median. The dimension may be a value obtained from an electron microscopy analysis. The dimension may be a value calculated from the composition, the optical properties, or a combination thereof (e.g., an UV-Vis absorption wavelength) of the quantum dots.

A quantum efficiency (or quantum yield) of the quantum dot may be readily and reproducibly measured in a solution state or a solid state (in a composite). In an embodiment, "quantum yield (or quantum efficiency)" may be a ratio, e.g., a relative amount, of photons emitted to photons absorbed, e.g., by a nanostructure (e.g., quantum dot) or population of nanostructures (e.g., quantum dots). In an embodiment, the quantum efficiency may be determined by any suitable method. For example, there may be two methods for measuring the quantum yield or efficiency: the absolute method and the relative method. The absolute method directly obtains the quantum yield by detecting all sample fluorescence through the use of an integrating sphere. In the relative method, the fluorescence intensity of a standard sample (e.g., a standard dye) may be compared with the fluorescence intensity of an unknown sample to calculate the quantum yield of the unknown sample. Coumarin 153, Coumarin 545, Rhodamine 101 inner salt, Anthracene, and Rhodamine 6G may be used as standard dye, depending on the PL wavelengths, but are not limited thereto.

The quantum yield (QY) (or the quantum efficiency) may be readily and reproducibly determined by using commercially available equipment, for example, from Hitachi Co. Ltd. or Hamamatsu Co. Ltd. and referring to the instruction manuals provided from the manufacturer.

The full width at half maximum (FWHM) and the maximum luminescent peak wavelength may be determined by a (photo)luminescent spectrum obtained by a spectrophotometer (or Fluorescence Spectrophotometer).

As used herein, the expression "not including cadmium (or other harmful heavy metal)" may refer to the case in which a concentration of cadmium (or another heavy metal deemed harmful) may be less than or equal to about 100 parts per million by weight (ppmw), less than or equal to about 50 ppmw, less than or equal to about 10 ppmw, less than or equal to about 1 ppmw, less than or equal to about 0.1 ppmw, less than or equal to about 0.01 ppmw, or about zero ppmw. In an embodiment, substantially no cadmium (or other harmful heavy metal) may be present or, if present, an amount of cadmium (or other harmful heavy metal) may be less than or equal to a detection limit or as an impurity level of a given analysis tool (e.g., an inductively coupled plasma atomic emission spectroscopy).

A quantum dot is a crystalline semiconductor material (e.g., semiconductor nanocrystal particle) having a nanoscale size. The quantum dot has a large surface area per a unit volume due to the very small particle size, and thus, exhibits a quantum confinement effect and different properties than those of a bulk material having the same elemental composition. The quantum dot may absorb light, e.g., energy, from an excitation source and then emit light energy corresponding to a bandgap energy of the quantum dot. The quantum dot has unique photoluminescence characteristics, and may show, e.g., exhibit, a relatively high luminous efficiency and excitation light absorption that may be desirable for a use in a photoluminescent color filter.

Some quantum dots exhibiting optical properties applicable to electronic devices such as for displays may be based on a cadmium compound. However, cadmium is one of the elements that can raise serious environment/health problems and concerns, and thus belongs to a restricted element under Restriction of Hazardous Substances Directive (RoHS) in many countries. Accordingly, development of a cadmium-free quantum dot having improved photoluminescence characteristics may be desired and of interest. Some of cadmium-free quantum dots may be based on a Group III-V compound. Cadmium-free quantum dots based on a Group III-V compound such as indium phosphide may often exhibit poor stability (e.g., chemical stability and thermal stability) in comparison with cadmium-based quantum dots and may exhibit a considerable deterioration of luminescent properties after being subjected to a process for their application in an electronic device.

A photoluminescence property and stability may be improved by passivating an InP-based core with a shell having increased thickness. The shell may include a Group II-VI compound such as ZnS, ZnSe, and ZnSeS. While a band level difference between the core and shell materials may be large enough to suppress exciton diffusion, a crystal lattice constant difference between the shell and the InP-based core may be high, as well. In addition, indium phosphide tends to form non-uniform core particles due to its high covalent bonding property, resulting in many surface defects. The aforementioned features of the InP based core may make a uniform passivation of the core with a shell difficult to achieve.

As to the photoluminescence property, a quantum dot may use blue light as an excitation light or an incident light. While the cadmium-based quantum dots may exhibit a relatively high absorption for blue light, most of cadmium-free quantum dots (particularly, those emitting green light) may not exhibit a desired level of absorption for the blue light.

The present inventors have surprisingly found that a shell including zinc, selenium, and sulfur at a controlled thickness (e.g., a ZnSe shell having a thickness of greater than or equal to about 1 nm and a ZnS shell having a thickness of less than or equal to about 0.7 nm) may contribute to providing improved luminous properties together with an increased blue light absorption. However, the present inventors have also surprisingly found that in the quantum dots including a shell including zinc, selenium, and sulfur at a controlled thickness, the ZnSe shell may only provide a small contribution to blue light absorption, and thus a thin shell of a ZnSe may be advantageous for increasing the absorption. However, in the preparation of cadmium-free, core shell quantum dots, it may be difficult to make the shell thickness thin enough, because in order to be used in a color filter, the quantum dots may be subjected to a process for providing a quantum dot composite pattern via a photoresist technology or an ink-jet technology, which involves a high temperature baking process or a step that can cause a surface damage of each quantum dot. Thus, in the case of indium phosphide based quantum dots, it may be a challenging task to achieve a relatively high level of absorption and a relatively high level of luminous efficiency, at the same time.

The present inventors have also surprisingly found that while an increased thickness of a shell may be required to achieve a desired level of stability and luminous properties of a cadmium-free quantum dot, an increase in the shell thickness may result in an increase of a weight per a single quantum dot, which may in turn lead to a decrease in the total number of quantum dots for a given weight of the quantum dot polymer composite, and as a result, a composite including quantum dots each having an increased shell thickness may show, e.g., exhibit, a decreased absorption for the excitation light.

Moreover, most (or almost all) indium phosphide based core shell quantum dots that emit green light with a desired luminous efficiency may exhibit a UV-Vis absorption (spectroscopy) curve of a decreasing absorbance with an increase of a wavelength, in particular, in a blue light region of greater than or equal to about 450 nm and less than or equal to about 470 nm. The present inventors have surprisingly found that the aforementioned shape of the UV-Vis absorption curve may lead to a relatively sharp decrease in an absorption of quantum dot composite, for example, when an OLED emitting light of a wavelength longer than 450 nm is used as a light source.

When applied as a patterned film such as a color filter, e.g., in a display, a decrease in the excitation light absorption can be a direct cause of blue light leakage in a display device, which may have an adverse effect on color reproducibility (e.g., Digital Cinema Initiatives (DCI) matching ratio) of a display device, and may cause a decrease in a luminous efficiency as well, for example, by forcing the display device to use an absorption type color filter for preventing the blue light leakage. Such a low absorption of the quantum dots may also be translated into a reduced level of luminance in the device including the same.

In an embodiment, a color filter includes a plurality of quantum dots (e.g., a mixture of predetermined quantum dot populations) having the structures/compositions recited herein, for example, in a predetermined distribution recited herein, realizing, e.g., exhibiting, desired optical properties (e.g., a high level of light conversion efficiency or light conversion together with an incident light absorption at the same time) in an environmentally friendly manner and thus a device or an apparatus including the color filter of the embodiment may exhibit enhanced brightness, a low light loss, and improved color purity. In an embodiment, the luminescent type color filter may achieve an improved level of absorption for an incident light from a light source emitting light of a wavelength from about 450 nm to about 470 nm.

In an embodiment, a (luminescent type) color filter (or color conversion panel, as used herein the term "color conversion panel" and the term (luminescent type) color filter can be used interchangeably) may include a first pixel or subpixel (e.g., a first color conversion region) that is configured to emit a first light and optionally a second pixel or subpixel (e.g., a second color conversion region) that is configured to emit a second light. The first pixel may include a first quantum dot polymer composite (hereinafter, at times, simply referred to as "quantum dot composite").

The first pixel and the second pixel may be spaced and a partition wall may be disposed between the first pixel and the second pixel, for example providing an optical isolation.

In an embodiment, the first pixel (or the second pixel) may be configured to emit green light when photo-excited or provided, e.g., irradiated, with an incident light. In an embodiment, the first pixel (or the second pixel) may be configured to emit red light when provided, e.g., irradiated, with an incident light.

The green light may have a luminescent peak wavelength of greater than or equal to about 500 nm, greater than or equal to about 505 nm, greater than or equal to about 510 nm, greater than or equal to about 515 nm, greater than or equal to about 520 nm, or greater than or equal to about 525 nm. The green light may have a luminescent peak wavelength of less than or equal to about 560 nm, less than or equal to about 555 nm, less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm.

The red light may have a luminescent peak wavelength of from about 600 nm to about 680 nm, from about 620 nm to about 650 nm, or a combination thereof.

In an embodiment, the first pixel may emit green light and the second pixel may emit red light. The second pixel may include a second quantum dot composite. As used herein, unless recited to the contrary, details of the first pixel and the first quantum dot composite may be applied to the second pixel and the second quantum dot composite.

The first pixel (or the quantum dot composite or a plurality of the quantum dots included therein) may not include cadmium, lead, mercury, or a combination thereof.

In an embodiment, in a pixel of the color filter, a quantum dot composite may include a matrix and a plurality of quantum dots (for example, randomly) dispersed (or distributed) in the matrix. In a size analysis, for example, made with using an electron microscope, the plurality of quantum dots may exhibit a multi-modal distribution having a first peak particle size (e.g., a first mode or a left peak) and a second peak particle size (e.g., a second mode or a right peak). The second peak particle size is greater than the first peak particle size. A difference between the first peak particle size and the second peak particle size may be less than or equal to about 5 nm, less than or equal to about 4.8 nm, less than or equal to about 4.5 nm, less than or equal to about 4.3 nm, less than or equal to about 4.2 nm, less than or equal to about 4.1 nm, less than or equal to about 4 nm, less than or equal to about 3.9 nm, less than or equal to about 3.8 nm, less than or equal to about 3.7 nm, less than or equal to about 3.6 nm, less than or equal to about 3.5 nm, less than or equal to about 3.4 nm, less than or equal to about 3.3 nm, less than or equal to about 3.2 nm, less than or equal to about 3.1 nm, less than or equal to about 3 nm, less than or equal to about 2.9 nm, less than or equal to about 2.8 nm, less than or equal to about 2.7 nm, less than or equal to about 2.6 nm, less than or equal to about 2.5 nm, less than or equal to about 2.4 nm, less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, less than or equal to about 1.4 nm, less than or equal to about 1.3 nm, less than or equal to about 1.2 nm, less than or equal to about 1.1 nm, or less than or equal to about 1 nm.

Figure 1B:
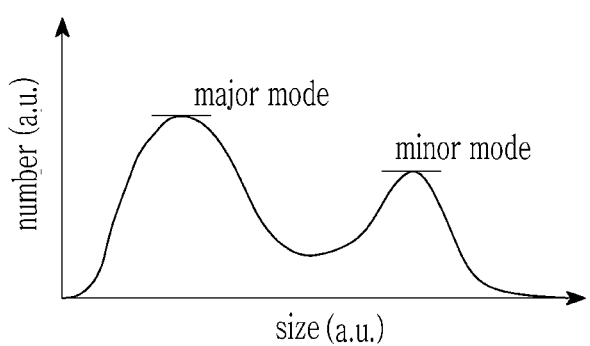
FIG. 1B is a graph of number (a.u.) versus size (a.u.) showing a size distribution (a bimodal distribution) of the quantum dots included in a quantum dot composite of a color filter according to an embodiment.

The multi-modal distribution may be a statistical distribution having two or more different modes. The multi-modal distribution may be a bimodal distribution having two peaks (or modes). In the multi-modal distribution, the different peaks (modes) may form local maxima, respectively. The local maximum or the mode refers to a point where the frequency (or the number) stops increasing and starts decreasing (see FIG. 1A and FIG. 1B).

The multi-modal distribution of the quantum dots may indicate that a given population showing the same is a mixture of at least two (or more) different populations each having a normal distribution (e.g., showing a bell-curved probability distribution function). In an embodiment, the multi-modal distribution may be represented by a probability distribution function, which is an equally-weighted average of the bell-shaped probability distribution functions of the two normal distributions (see FIG. 1A). In an embodiment, in the multi-modal distribution, two modes (peaks) may not be the same, having different heights (greater frequencies, i.e., greater numbers), and a higher mode may be referred to as a major mode and the other mode may be referred to as a minor mode (see FIG. 1B).

In a color filter of an embodiment, a quantum dot composite may include a mixture of quantum dots wherein at least two different quantum dot population (e.g., a first quantum dot population and a second quantum dot population) are (randomly or uniformly) mixed, each of the populations may have an average particle size different from one another in the mixture enough to show a multimodal (or a bimodal) distribution and optionally a normal distribution. In an embodiment, the plurality of the quantum dots in the quantum dot composite of the first pixel may include a first quantum dot population and a second quantum dot population, wherein the first quantum dot population includes first quantum dots and shows a first peak particle size (e.g., a first mode) and the second quantum dot population includes second quantum dots and show a second peak particle size (a second mode).

The plurality of the quantum dots may have a core shell structure, respectively and may include a semiconductor nanocrystal core including indium (In) and phosphorus (P), and a semiconductor nanocrystal shell disposed on the semiconductor nanocrystal core, the semiconductor nanocrystal shell including zinc, selenium, and sulfur.

The core may have a size of greater than or equal to about 1 nm (e.g., greater than or equal to about 2 nm) and less than or equal to about 2.7 nm, less than or equal to about 2.6 nm, or less than or equal to about 2.5 nm.

The first quantum dot population and the second quantum dot population may have cores having the same composition. In an embodiment, the first quantum dot population may include quantum dots each having the core of the same average size and the same composition as the second quantum dot population but having a shell disposed on the core, wherein an average thickness of the shell is different from (e.g., may be less than) that of the second quantum dot population. In an embodiment, an average size (or first mode) of the first quantum dot population may be less than that of the second quantum dot population.

The first quantum dot population and the second quantum dot population may emit light having the same color, for example, when provided, e.g., irradiated, with incident light of about 450 nm in a composite state. In an embodiment, a difference between a photoluminescent peak wavelength of the first quantum dot population and a photoluminescent peak wavelength of the second quantum dot population may be less than or equal to about 30 nm, less than or equal to about 25 nm, less than or equal to about 20 nm, less than or equal to about 15 nm, less than or equal to about 10 nm, less than or equal to about 9 nm, less than or equal to about 8 nm, less than or equal to about 7 nm, less than or equal to about 6 nm, less than or equal to about 5 nm, or less than or equal to about 4 nm. In an embodiment, the first quantum dot population and the second quantum dot population emit lights of substantially the same color with, e.g., as, each other. In an embodiment, a full width at half maximum (fwhm) of a photoluminescent peak of the quantum dot composite including the first quantum dot population and the second quantum dot population may be less than or equal to about 45 nm, less than or equal to about 44 nm, less than or equal to about 43 nm, less than or equal to about 42 nm, less than or equal to about 41 nm, less than or equal to about 40 nm, less than or equal to about 39 nm, less than or equal to about 38 nm, or less than or equal to about 37 nm. The fwhm may be greater than or equal to about 10 nm, greater than or equal to about 15 nm, greater than or equal to about 20 nm, greater than or equal to about 25 nm, greater than or equal to about 30 nm, or greater than or equal to about 35 nm.

In an embodiment, a photoluminescent peak wavelength of the first quantum dot population may be shorter than that of the second quantum dot population. In an embodiment, a photoluminescent peak wavelength of the first quantum dot population may be longer than that of the second quantum dot population.

In an embodiment, the first quantum dot population may include (e.g., exhibit in a size analysis) a first peak particle size. In an embodiment, the second quantum dot population may include (e.g., exhibit in a size analysis) a second peak particle size. In an embodiment, the size of the quantum dot may refer to a diameter or an equivalent diameter obtained from a two-dimensional image of an electron microscopy analysis (e.g., under an assumption of a circle). A size of the quantum dot(s) may be determined by using a result (e.g., an image) of a (transmission) electron microscopy analysis and any suitable image analysis computer program (e.g., Image J).

In an embodiment, a difference between the first peak particle size and the second peak particle size may be greater than or equal to about 0.5 nm, greater than or equal to about 0.6 nm, greater than or equal to about 0.7 nm, greater than or equal to about 0.8 nm, greater than or equal to about 0.9 nm, greater than or equal to about 1 nm, greater than or equal to about 1.1 nm, greater than or equal to about 1.2 nm, greater than or equal to about 1.3 nm, greater than or equal to about 1.4 nm, greater than or equal to about 1.5 nm, greater than or equal to about 1.6 nm, greater than or equal to about 1.7 nm, greater than or equal to about 1.8 nm, greater than or equal to about 1.9 nm, greater than or equal to about 2 nm, greater than or equal to about 2.3 nm, greater than or equal to about 2.5 nm, greater than or equal to about 2.7 nm, greater than or equal to about 3 nm, or greater than or equal to about 3.5 nm.

In an embodiment, the first peak particle size may be greater than or equal to about 3.5 nm, greater than or equal to about 3.6 nm, greater than or equal to about 3.7 nm, greater than or equal to about 3.8 nm, greater than or equal to about 3.9 nm, greater than or equal to about 4.0 nm, greater than or equal to about 4.1 nm, greater than or equal to about 4.2 nm, greater than or equal to about 4.3 nm, greater than or equal to about 4.4 nm, or greater than or equal to about 4.5 nm. In an embodiment, the first peak particle size may be less than or equal to about 7 nm, less than or equal to about 6.9 nm, less than or equal to about 6.8 nm, less than or equal to about 6.7 nm, less than or equal to about 6.6 nm, less than or equal to about 6.5 nm, less than or equal to about 6.4 nm, less than or equal to about 6.3 nm, less than or equal to about 6.2 nm, less than or equal to about 6.1 nm, less than or equal to about 6 nm, less than or equal to about 5.9 nm, less than or equal to about 5.8 nm, less than or equal to about 5.7 nm, less than or equal to about 5.6 nm, less than or equal to about 5.5 nm, less than or equal to about 5.4 nm, less than or equal to about 5.3 nm, less than or equal to about 5.2 nm, less than or equal to about 5.1 nm, less than or equal to about 5 nm, less than or equal to about 4.9 nm, less than or equal to about 4.8 nm, less than or equal to about 4.7 nm, less than or equal to about 4.6 nm, less than or equal to about 4.5 nm, less than or equal to about 4.4 nm, less than or equal to about 4.3 nm, less than or equal to about 4.2 nm, less than or equal to about 4.1 nm, or less than or equal to about 4 nm.

In an embodiment, the second peak particle size may be greater than or equal to about 5 nm, greater than or equal to about 5.1 nm, greater than or equal to about 5.2 nm, greater than or equal to about 5.3 nm, greater than or equal to about 5.4 nm, greater than or equal to about 5.5 nm, greater than or equal to about 5.6 nm, greater than or equal to about 5.7 nm, greater than or equal to about 5.8 nm, greater than or equal to about 5.9 nm, greater than or equal to about 6 nm, greater than or equal to about 6.1 nm, greater than or equal to about 6.2 nm, greater than or equal to about 6.3 nm, greater than or equal to about 6.4 nm, greater than or equal to about 6.5 nm, greater than or equal to about 6.6 nm, greater than or equal to about 6.7 nm, greater than or equal to about 6.8 nm, greater than or equal to about 6.9 nm, or greater than or equal to about 7 nm. In an embodiment, the second peak particle size may be less than or equal to about 10 nm, less than or equal to about 9.5 nm, less than or equal to about 9 nm, less than or equal to about 8.5 nm, less than or equal to about 8 nm, less than or equal to about 7.9 nm, less than or equal to about 7.8 nm, less than or equal to about 7.7 nm, less than or equal to about 7.6 nm, less than or equal to about 7.5 nm, less than or equal to about 7.4 nm, less than or equal to about 7.3 nm, less than or equal to about 7.2 nm, less than or equal to about 7.1 nm, less than or equal to about 7 nm, less than or equal to about 6.9 nm, less than or equal to about 6.8 nm, less than or equal to about 6.7 nm, less than or equal to about 6.6 nm, less than or equal to about 6.5 nm, less than or equal to about 6.4 nm, less than or equal to about 6.3 nm, less than or equal to about 6.2 nm, less than or equal to about 6.1 nm, less than or equal to about 6 nm, less than or equal to about 5.9 nm, less than or equal to about 5.8 nm, less than or equal to about 5.7 nm, less than or equal to about 5.6 nm, or less than or equal to about 5.5 nm.

A shell thickness and a shell composition may be controlled taking into consideration optical properties of the quantum dots and a process stability thereof. An embodiment may provide a quantum dot composite or a pattern thereof that may achieve not only improved absorption with respect to incident light (e.g., blue light) having a desired wavelength but also enhanced luminous efficiency on the blue light excitation.

In the color filter of an embodiment, the quantum dot composite further includes the quantum dot(s) (e.g., the second quantum dots) including a indium phosphide based core and a shell with an increased thickness for example to have a first layer including Zn and Se at a thickness of greater than or equal to about 1 nm (or greater than or equal to about 3 monolayers) and a second layer including Zn and S at a thickness of less than or equal to about 0.7 nm, showing improved luminous efficiency and a relatively high absorption for a blue light of about 450 nm, as well.

In the quantum dots of the second quantum dot population, the first layer may include a semiconductor nanocrystal including zinc and selenium. A thickness of the first layer may be greater than or equal to about 1.2 nm, greater than or equal to about 1.5 nm, or greater than or equal to about 2 nm. A thickness of the first layer may be less than or equal to about 3 nm, less than or equal to about 2.9 nm, less than or equal to about 2.8 nm, less than or equal to about 2.7 nm, less than or equal to about 2.6 nm, less than or equal to about 2.5 nm, less than or equal to about 2.4 nm, less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, or less than or equal to about 1.4 nm. The first layer may include or may not include sulfur.

The second layer may be disposed directly on the first layer. In the quantum dots of the second quantum dot population, the second layer may include a semiconductor nanocrystal including zinc and sulfur. A thickness of the second layer may be less than or equal to about 0.7 nm, less than or equal to about 0.65 nm, less than or equal to about 0.64 nm, less than or equal to about 0.63 nm, less than or equal to about 0.62 nm, less than or equal to about 0.61 nm, less than or equal to about 0.6 nm, less than or equal to about 0.55 nm, less than or equal to about 0.5 nm, less than or equal to about 0.45 nm, or less than or equal to about 0.4 nm. In an embodiment, a thickness of the second layer may be greater than or equal to about 0.15 nm, greater than or equal to about 0.16 nm, greater than or equal to about 0.17 nm, greater than or equal to about 0.18 nm, greater than or equal to about 0.19 nm, greater than or equal to about 0.2 nm, greater than or equal to about 0.21 nm, greater than or equal to about 0.22 nm, greater than or equal to about 0.23 nm, greater than or equal to about 0.24 nm, greater than or equal to about 0.25 nm, greater than or equal to about 0.26 nm, or greater than or equal to about 0.27 nm.

The second quantum dots or the second quantum dot population may include a mole ratio of zinc to indium of less than or equal to about 48:1, less than or equal to about 47:1, less than or equal to about 46:1, less than or equal to about 45:1, less than or equal to about 44:1, less than or equal to about 43:1, less than or equal to about 42:1, less than or equal to about 41:1, less than or equal to about 40:1, less than or equal to about 35:1, less than or equal to about 25:1, less than or equal to about 23:1, less than or equal to about 22:1, less than or equal to about 20:1, less than or equal to about 15:1, or less than or equal to about 10:1. In an embodiment, the second quantum dots or the second quantum dot population may include a mole ratio of zinc to indium of greater than or equal to about 3:1, greater than or equal to about 4:1, greater than or equal to about 5:1, greater than or equal to about 6:1, greater than or equal to about 7:1, greater than or equal to about 8:1, greater than or equal to about 9:1, greater than or equal to about 10:1, greater than or equal to about 20:1, greater than or equal to about 30:1, greater than or equal to about 35:1, greater than or equal to about 40:1, or greater than or equal to about 43:1.

The second quantum dots or the second quantum dot population may include a mole ratio of sulfur with respect to selenium of less than or equal to about 2.4:1, less than or equal to about 2.3:1, less than or equal to about 2.2:1, less than or equal to about 2.1:1, less than or equal to about 2.0:1, less than or equal to about 1.9:1, less than or equal to about 1.8:1, less than or equal to about 1.7:1, less than or equal to about 1.6:1, less than or equal to about 1.5:1, less than or equal to about 1.4:1, less than or equal to about 1.3:1, less than or equal to about 1.2:1, less than or equal to about 1.1:1, less than or equal to about 1:1, less than or equal to about 0.9:1, less than or equal to about 0.8:1, less than or equal to about 0.7:1, or less than or equal to about 0.6:1. In the second quantum dots or the second quantum dot population of an embodiment, a mole ratio of sulfur to selenium may be greater than or equal to about 0.05:1, greater than or equal to about 0.07:1, greater than or equal to about 0.1:1, greater than or equal to about 0.2:1, greater than or equal to about 0.3:1, greater than or equal to about 0.4:1, greater than or equal to about 0.5:1.

In a UV-Vis absorption spectroscopy analysis, the second quantum dots may exhibit a first absorption peak in a wavelength range of from about 475 nm to about 525 nm, from about 480 nm to about 520 nm, from about 485 nm to about 515 nm, from about 490 nm to about 510 nm, from about 500 nm to about 505 nm, or a combination thereof. In a UV-Vis absorption spectroscopy analysis, the second quantum dots may exhibit a first absorption peak that is present in a longer wavelength region than that of the first quantum dots, as recited herein.

In an embodiment, a difference between a first absorption peak of the first quantum dots and a first absorption peak of the second quantum dots may be less than or equal to about 35 nm, less than or equal to about 30 nm, less than or equal to about 25 nm, less than or equal to about 20 nm, less than or equal to about 15 nm, or less than or equal to about 10 nm. In an embodiment, the difference between the first absorption peaks of the first and second quantum dots may be greater than or equal to about 5 nm, greater than or equal to about 10 nm, or greater than or equal to about 15 nm.

The second quantum dots may exhibit an improved level of quantum efficiency (or quantum yield) and at the same time may show, e.g., exhibit, a relatively higher absorption for the incident light for example having a wavelength of about 450 nm. In the case of a film including the second quantum dots at a predetermined thickness, an absorption for a blue light of about 450 nm (or about 449 nm) may be relatively high level for example such as of greater than or equal to about 87%, greater than or equal to about 88%, greater than or equal to about 89%, or greater than or equal to about 90%.

The present inventors have surprisingly found that the absorption of the second quantum dots may not be sufficiently high for example, for the incident light of the increased wavelength (e.g., greater than or equal to about 450 nm or about 460 nm) for example for blue light provided by an organic light emitting diode. In an embodiment, the OLED blue light source may emit blue light having a relatively long wavelength for example, in a range of greater than or equal to about 455 nm, greater than or equal to about 456 nm, greater than or equal to about 457 nm, greater than or equal to about 458 nm, greater than or equal to about 459 nm, greater than or equal to about 460 nm, or greater than or equal to about 461 nm and less than or equal to about 475 nm, less than or equal to about 470 nm, or less than or equal to about 465 nm and having a tail at a longer wavelength region, and the second quantum dots may not efficiently absorb light from the aforementioned type of the OLED blue light source.

Without wishing to be bound by any theory, it is believed that the second quantum dots may tend to have a valley in a range of from about 450 nm to about 500 nm (e.g., less than or equal to about 480 nm) in a UV-Vis absorption spectrum and the UV-Vis absorption curve of the second quantum dot may tend to have a negative differential coefficient at a wavelength of 450 nm.

The present inventors have surprisingly found that by mixing the second quantum dot population with a population of first quantum dots (i.e., a first quantum dot population) that have a similar composition to the second quantum dot population, a resulting quantum dot mixture may show, e.g., exhibit, substantially different optical properties (e.g., a different UV-Vis absorption spectrum) from the second quantum dot population and may address the aforementioned issues that may occur otherwise when a quantum dot population run into in its use as a color filter including a quantum dot composite. In an embodiment, the first quantum dots may have a reduced first shell thickness. In an embodiment, the first quantum dots may have a controlled (e.g., reduced) size (or average size).

In an embodiment, the first quantum dots have a core shell structure and a thickness of the shell may be about 6 monolayers (ML) or less, about 5.5 ML or less, about 5 ML or less, or about 4.5 ML or less. The thickness of the shell of the first quantum dots may be about 2 ML or more, about 2.5 ML or more, about 3 ML or more, or about 3.5 ML or more. The thickness of the shell of the first quantum dots may be less than or equal to about 2.3 nm, for example, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, or less than or equal to about 1.4 nm. The thickness of the shell of the first quantum dots may be greater than or equal to about 0.5 nm, greater than or equal to about 0.6 nm, greater than or equal to about 0.7 nm, greater than or equal to about 0.8 nm, greater than or equal to about 0.9 nm, or greater than or equal to about 1 nm.

The first quantum dot population may have a shell disposed on the core. In an embodiment, the shell may have a multi-layered structure. In the multi-layered shell, a first semiconductor nanocrystal shell (or referred to as the ZnSeS layer or the first shell) may be disposed (e.g., directly) on the semiconductor nanocrystal core and may include zinc, selenium, and sulfur, and the second semiconductor nanocrystal shell (or referred to as the ZnS layer or the second shell) may be disposed (e.g., directly) on the first shell and may include zinc and sulfur. A composition of the second shell may be different from that of the first shell. The second semiconductor nanocrystal shell may be an outermost layer of the quantum dots.

A thickness of the ZnSeS layer may be about 4 monolayers (ML) or less, about 3.5 ML or less, or about 3 ML or less. The thickness of the first shell may be about 1 ML or more, about 1.5 ML or more, about 2 ML or more, or about 2.5 ML or more. A thickness of the ZnS layer may be less than or equal to about 1 nm, less than or equal to about 0.9 nm, less than or equal to about 0.8 nm, less than or equal to about 0.7 nm, or less than or equal to about 0.6 nm. The thickness of the second semiconductor nanocrystal shell may be about 1 ML or more, or about 1.5 ML or more.

In the plurality of quantum dots (e.g., in the first quantum dots, in the second quantum dots, or in a combination thereof) according to an embodiment, a mole ratio of sulfur to selenium may be less than or equal to about 3.5:1, less than or equal to about 3.4:1, less than or equal to about 3.3:1, less than or equal to about 3.2:1, less than or equal to about 3.1:1, less than or equal to about 3:1, less than or equal to about 2.9:1, less than or equal to about 2.8:1, less than or equal to about 2.7:1, less than or equal to about 2.6:1, less than or equal to about 2.5:1, less than or equal to about 2.4:1, less than or equal to about 2.3:1, less than or equal to about 2.2:1, less than or equal to about 2.1:1, less than or equal to about 2.0:1, less than or equal to about 1.9:1, less than or equal to about 1.8:1, less than or equal to about 1.7:1, less than or equal to about 1.6:1, less than or equal to about 1.5:1, less than or equal to about 1.4:1, less than or equal to about 1.3:1, less than or equal to about 1.2:1, less than or equal to about 1.1:1, or less than or equal to about 1:1. In the plurality of quantum dots (e.g., in the first quantum dots, in the second quantum dots, or in a combination thereof) according to an embodiment, a mole ratio of sulfur to selenium may be greater than or equal to about 0.05:1, greater than or equal to about 0.07:1, greater than or equal to about 0.1:1, greater than or equal to about 0.2:1, greater than or equal to about 0.3:1, greater than or equal to about 0.4:1, greater than or equal to about 0.5:1, greater than or equal to about 0.6:1, greater than or equal to about 0.7:1, greater than or equal to about 0.8:1, or greater than or equal to about 0.9:1.

In the first quantum dots according to an embodiment, a mole ratio of zinc to indium may be less than or equal to about 24:1, less than or equal to about 23:1, less than or equal to about 22:1, less than or equal to about 21:1, less than or equal to about 20:1, less than or equal to about 19:1, less than or equal to about 18:1, less than or equal to about 17:1, less than or equal to about 16:1, less than or equal to about 15:1, or less than or equal to about 14:1. In the first quantum dots according to an embodiment, a mole ratio of zinc to indium may be greater than or equal to about 3:1, greater than or equal to about 4:1, greater than or equal to about 5:1, greater than or equal to about 6:1, greater than or equal to about 7:1, greater than or equal to about 8:1, greater than or equal to about 9:1, greater than or equal to about 10:1, greater than or equal to about 11:1, greater than or equal to about 12:1, greater than or equal to about 13:1, greater than or equal to about 14:1, or greater than or equal to about 15:1.

In the first quantum dots, a mole ratio of phosphorus to indium may be greater than or equal to about 0.7:1, greater than or equal to about 0.75:1, greater than or equal to about 0.8:1, greater than or equal to about 0.85:1, or greater than or equal to about 0.9:1. In the first quantum dots, a mole ratio of phosphorus to indium may be less than or equal to about 1.5:1, less than or equal to about 1.4:1, less than or equal to about 1.3:1, less than or equal to about 1.2:1, less than or equal to about 1.1:1, or less than or equal to about 1:1. In an embodiment, the mole ratio of phosphorous to indium may be from about 0.7:1 to about 1:1, from about 0.8:1 to about 1.2:1, from about 0.85:1 to about 1.3:1, from about 0.9 to about 1, or a combined range recited herein.

In the first quantum dots, a mole ratio of indium to a total moles of chalcogen element (e.g., a total sum of S and Se) may be greater than or equal to about 0.05:1, greater than or equal to about 0.06:1, or greater than or equal to about 0.07:1 and less than or equal to about 0.15:1, less than or equal to about 0.14:1, less than or equal to about 0.13:1, less than or equal to about 0.12:1, less than or equal to about 0.11:1, less than or equal to about 0.105:1, less than or equal to about 0.1:1, less than or equal to about 0.095, less than or equal to about 0.09:1, less than or equal to about 0.085:1, less than or equal to about 0.08:1, or less than or equal to about 0.075:1.

Figure 1C:
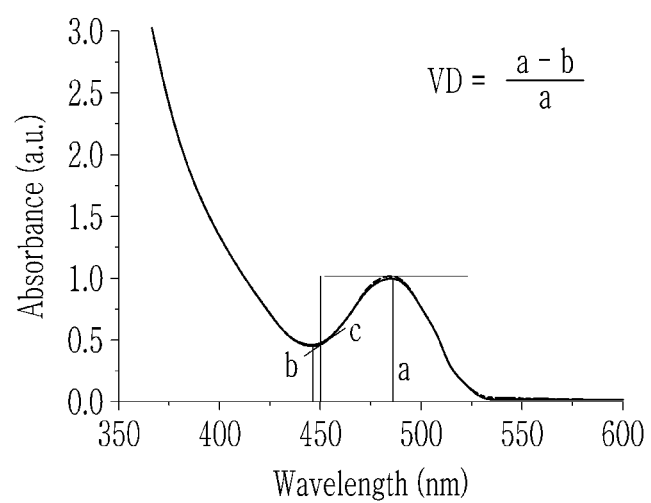
FIG. 1C is a graph of Absorption (arbitrary units (a.u.)) versus Wavelength (nanometers (nm)) illustrating a differential coefficient (i.e., a tangential slope) at a wavelength of about 450 nm of a UV-Vis absorption spectrum curve of quantum dots.

In a UV-Vis absorption spectrum curve, the first quantum dots may exhibit a valley at a wavelength range of less than or equal to about 450 nm and show a positive differential coefficient value at 450 nm (see the tangential slope c in FIG. 1C). In the UV-Vis absorption spectrum curve, the differential coefficient value at 450 nm may be greater than 0, for example, greater than or equal to about 0.001, greater than or equal to about 0.002, greater than or equal to about 0.003, greater than or equal to about 0.004, greater than or equal to about 0.005, or greater than or equal to about 0.006. The differential coefficient value may be less than or equal to about 0.03, less than or equal to about 0.025, less than or equal to about 0.02, less than or equal to about 0.015, less than or equal to about 0.01, less than or equal to about 0.0095, less than or equal to about 0.009, or less than or equal to about 0.0085. The differential coefficient value (i.e., a derivative of df(x)/dx, tangential slope) at 450 nm of the UV-Vis absorption curve may be measured by an analysis of the curve.

Like the second quantum dots, the first quantum dots may include an indium phosphide core and a shell including zinc, selenium, and sulfur. In an embodiment, the first quantum dots may be different from the second quantum dots in light of an average size, a specific shell composition/structure, or a combination thereof. The first quantum dots may have different optical properties from the second quantum dots.

The first quantum dots may show, e.g., have, a UV-Vis absorption spectrum with an upward sloping to the right (in other words, having a positive slope or a greater absorption with an increase of a wavelength) at a wavelength of about 450 nm. The first quantum dots may exhibit improved light absorption properties for a blue OLED light source. The present inventors have surprisingly found that the first quantum dots may have an absorption of greater than or equal to about 89%, or greater than or equal to about 90% at excitation with light of a wavelength of about 450 nm, and for an incident light of a wavelength of about 465 nm, the first quantum dots show even greater absorption for example of greater than or equal to about 91%, greater than or equal to about 92%, greater than or equal to about 93%, or greater than or equal to about 94%.

In the UV-Vis absorption spectrum curve, a first absorption peak wavelength of the first quantum dots may be shorter than that of the second quantum dots. In the UV-Vis absorption spectrum curve, the first quantum dots may show, e.g., exhibit, a valley adjacent to the first absorption peak in a shorter wavelength region than the second quantum dots. In the UV-Vis absorption spectrum curve, the first quantum dots may show, e.g., exhibit, a valley adjacent to the first absorption peak in a range of greater than or equal to about 400 nm, greater than or equal to about 410 nm, greater than or equal to about 420 nm, or greater than or equal to about 425 nm and less than or equal to about 450 nm. The first quantum dots may exhibit the first absorption peak in the UV-Vis absorption spectrum in a range of from about 450 nm to about 525 nm, from about 455 nm to about 520 nm, from about 450 nm to about 515 nm, from about 460 nm to about 510 nm, from about 465 nm to about 505 nm, from about 470 nm to about 500 nm, from about 475 nm to about 495 nm, from about 480 nm to about 490 nm, or a combination thereof.

The present inventors have surprisingly found that the plurality of the quantum dots including the first quantum dots and the second quantum dots have the multi-modal distribution recited herein in a size analysis thereof and when included in a quantum dot composite, can realize, e.g., exhibit, improved optical (or luminous) properties compared to each of the first quantum dot population and the second quantum dot population.

In a quantum dot composite, the plurality of the quantum dots may exhibit relatively improved light absorption at a photo-excitation of about 465 nm and may realize, e.g., exhibit, improved quantum efficiency together with a narrowed full width at half maximum, while also suppressing a tail emission. When applied to, e.g., used in, a device, such a quantum dot composite may reduce a filter loss of light and achieve improved color reproducibility. In addition, the plurality of the quantum dots may have a light absorption per a weight and thus a dead volume of a given quantum dot composite that cannot contribute the light emission may be minimized. The quantum dot composite of an embodiment may also show an improved thermal stability, which may be desirable for obtaining a pattern thereof.

Figure 1D:
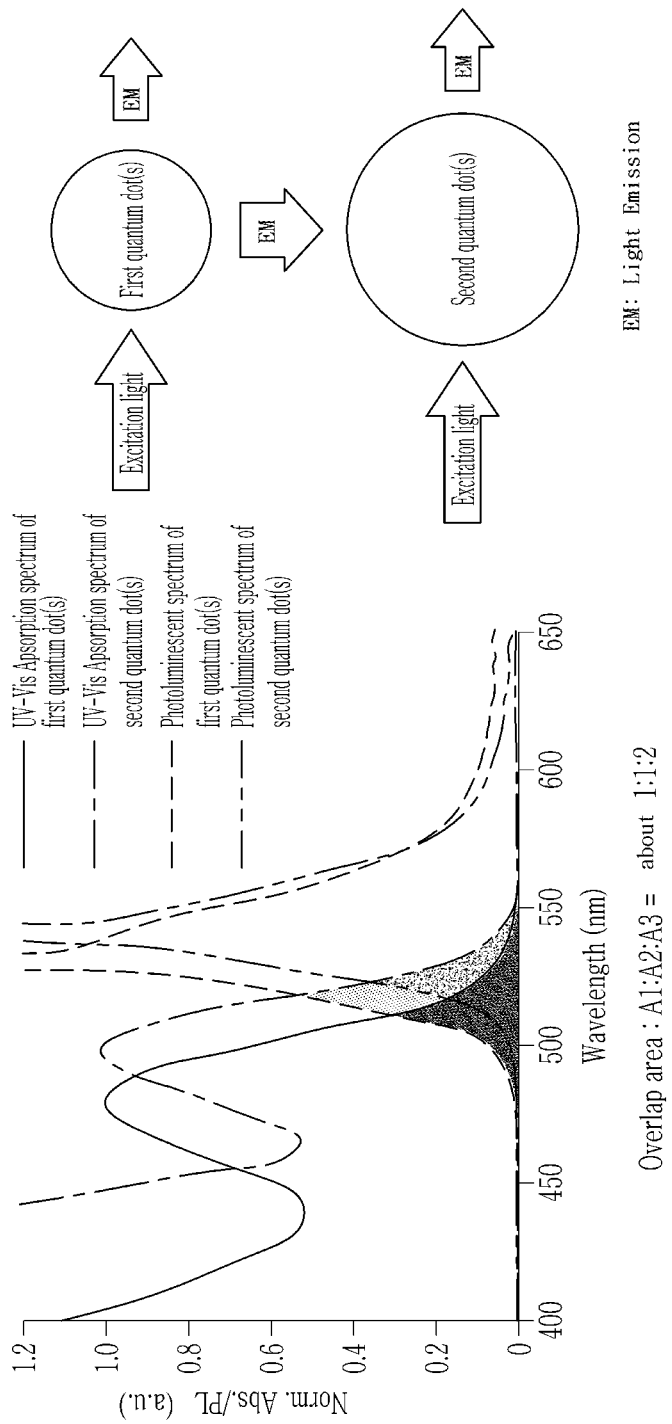
FIG. 1D is a graph of Normalized Absorption or Photoluminescence (Norm. Abs./PL) (a.u.) versus Wavelength (nm) and schematically illustrates luminous properties of a first quantum dot population and a second quantum dot population included in a quantum dot composite of a color filter of an embodiment, FIG. 2A schematically represents a process (e.g., a photolithography process) of producing a quantum dot composite pattern using a composition according to an embodiment.

Without wishing to be bound by any theory, referring to FIG. 1D, it is believed that in the plurality of the quantum dots included in a quantum dot composite of a color filter of an embodiment, the first quantum dot population may show, e.g., exhibit, a first absorption peak wavelength and a luminescent peak wavelength shorter than those of the second quantum dot population, and the mixing of the first quantum dot population with the second quantum dot population may result in an overlap between the photoluminescent spectrums of the first and the second quantum dot populations and an overlap between the UV-Vis absorption spectrums of the first and the quantum dot populations. In an embodiment, a ratio among Area A1 (for example, corresponding to an overlapped area of the UV-Vis absorption spectrum and the photoluminescent spectrum of the first quantum dots), Area A2 (for example, corresponding to an overlapped area of the UV-Vis absorption spectrum and the photoluminescent spectrum of the second quantum dots), and Area A3 (for example, an overlapped area between the UV-Vis absorption spectrum of the second quantum dots and the photoluminescent spectrum of the first quantum dots) A1:A2:A3 may be about 1:1:2.

Without wishing to be bound by any theory, it is believed that overlapping the spectrums between the quantum dot populations as recited herein may increase a chance for a shorter wavelength green light emitted from the first quantum dot population to be re-absorbed by the second quantum dot population, and in the quantum dot composite of the embodiment, the second quantum dot population's re-absorption of the light from the first quantum dot population is believed to contribute to an improvement of luminescent efficiency of the quantum dot composite more.

Accordingly, in an embodiment, the quantum dot composite may achieve a desired level of luminous properties even when it includes a relatively small fraction of the second quantum dot population, and in the quantum dot composite of the embodiment, a tail emission of the first quantum dot population may be substantially suppressed, reduced, or a combination thereof and thus the quantum dot composite of the embodiment may achieve a narrower full width at half maximum in its entirety. In addition, the quantum dot composite may include the first quantum dot population in a relatively greater fraction and in a resulting film or pattern, it may exhibit an improved absorption property together with an enhanced photoluminescent efficiency.

In an embodiment, the plurality of the quantum dots included in the quantum dot composite may exhibit a multi-modal or a bimodal distribution wherein two modes are unequal, the first peak particle size may be a major mode and the second peak particle size may be a minor mode. In an embodiment, a ratio of the number (frequency) of the second peak particle size (including the second quantum dots) with respect to the number (frequency) of the first peak particle size (including the first quantum dots) may be less than or equal to about 4:1, less than or equal to about 3.5:1, less than or equal to about 3:1, less than or equal to about 2.5:1, less than or equal to about 2:1, less than or equal to about 1.5:1, less than or equal to about 1:1, less than or equal to about 0.9:1, less than or equal to about 0.8:1, less than or equal to about 0.7:1, less than or equal to about 0.6:1, less than or equal to about 0.5:1, or less than or equal to about 0.45:1. In an embodiment, a ratio of the number (frequency) of the second peak particle size (including the second quantum dots) with respect to the number (frequency) of the first peak particle size (including the first quantum dots) may be greater than or equal to about 0.1:1, greater than or equal to about 0.15:1, greater than or equal to about 0.2:1, greater than or equal to about 0.25:1, greater than or equal to about 0.3:1, greater than or equal to about 0.35:1, greater than or equal to about 0.4:1, greater than or equal to about 0.5:1, greater than or equal to about 0.6:1, greater than or equal to about 0.7:1, greater than or equal to about 0.8:1, greater than or equal to about 0.9:1, or greater than or equal to about 1:1.

The quantum dot composite including the aforementioned plurality of the quantum dots may exhibit improved optical properties in comparison with a composite adopting each population respectively only. In an embodiment, the luminous properties (a luminous efficiency, a FWHM, or a tail emission) of the quantum dot composite may be improved in comparison with a sum calculated by mixing the first quantum dot population and the second quantum dot population. In an embodiment, the quantum dot composite may exhibit a narrower FWHM together with a reduced tail emission.

In an embodiment, a UV-Vis absorption spectrum of the quantum dot composite may include a valley that may be relatively clearly noticed. In a UV-vis absorption spectrum, the quantum dot composite of an embodiment may have a valley that is adjacent to the first absorption peak. As used herein, the term "the valley" of the UV-Vis absorption spectrum refers to a portion where a slope of a tangent line of a UV-Vis absorption spectrum curve changes from a negative value to a positive value, as a wavelength increases (see in FIG. 1C). The valley may exist near the first absorption peak (see FIG. 1C).

In a UV-vis absorption spectrum, the quantum dot composite may show, e.g., exhibit, a depth of the valley adjacent to the first absorption peak (i.e., a valley depth (VD)) as defined by the following equation and may be greater than or equal to about 0.2, greater than or equal to about 0.21, greater than or equal to about 0.22, greater than or equal to about 0.23, greater than or equal to about 0.24, greater than or equal to about 0.25, greater than or equal to about 0.26, greater than or equal to about 0.27, greater than or equal to about 0.28, greater than or equal to about 0.29, greater than or equal to about 0.3, greater than or equal to about 0.35, or greater than or equal to about 0.4:

$$1-(Abs_{valley}/Abs_{first})=VD$$

wherein, $Abs_{first}$ is an absorbance (a) at the first absorption peak, and $Abs_{valley}$ is an absorbance (b) at the lowest point of the valley adjacent to the first absorption peak. (see FIG. 1C)

The quantum dot composite may show, e.g., exhibit, an absorption for incident light of a wavelength of about 465 nm that is greater than or equal to about 80%, greater than or equal to about 81%, greater than or equal to about 82%, greater than or equal to about 83%, greater than or equal to about 84%, greater than or equal to about 85%, greater than or equal to about 86%, greater than or equal to about 87%, greater than or equal to about 88%, greater than or equal to about 89%, greater than or equal to about 90%, or greater than or equal to about 91% and/or less than or equal to about 100%, less than or equal to about 99%, less than or equal to about 98%, less than or equal to about 97%, less than or equal to about 96%, less than or equal to about 95%, less than or equal to about 94%, less than or equal to about 93%, less than or equal to about 92%, or less than or equal to about 91%.

The quantum dot composite may show, e.g., exhibit, an absorption for incident light of a wavelength of about 450 nm that is greater than or equal to about 87.5%, greater than or equal to about 88%, greater than or equal to about 88.5%, greater than or equal to about 89%, or greater than or equal to about 89.5% and/or less than or equal to about 100%, less than or equal to about 99%, less than or equal to about 98%, less than or equal to about 97%, less than or equal to about 96%, less than or equal to about 95%, less than or equal to about 94%, less than or equal to about 93%, less than or equal to about 92%, or less than or equal to about 91%.

In an embodiment, the quantum dot composite may exhibit a luminescent peak having a full width at half maximum of less than or equal to about 43 nm, less than or equal to about 42 nm, less than or equal to about 41 nm, less than or equal to about 40 nm, less than or equal to about 39 nm, less than or equal to about 38 nm, less than or equal to about 37 nm and greater than or equal to about 10 nm, greater than or equal to about 20 nm, or greater than or equal to about 30 nm.

In an embodiment, in a photoluminescent peak of the quantum dot composite that provided (e.g., excited) with incident light of wavelength of about 465 nm or about 450 nm, a percentage of a tail in a wavelength range of greater than or equal to about 580 nm may be less than or equal to about 18%, less than or equal to about 17.5%, less than or equal to about 17%, less than or equal to about 16.5%, less than or equal to about 16%, less than or equal to about 15.5%, or less than or equal to about 15% and/or greater than or equal to about 1%, greater than or equal to about 5%, greater than or equal to about 10%.

The percentage of the tail may be obtained from a ratio of a tail wavelength area (e.g., a region of greater than or equal to about 580 nm) in a photoluminescent spectrum with respect, e.g., relative, to a total area of the photoluminescent spectrum that is obtained by irradiating the quantum dot composite with a predetermined incident light (e.g., about 450 nm or about 465 nm)

In an embodiment, the tail wavelength may be determined by adding about 35 nm, about 40 nm, about, 41 nm, about 42 nm, about 43 nm, about 44 nm, about 45 nm, about 46 nm, about 47 nm, about 48 nm, about 49 nm, about 50 nm, or higher, e.g., greater, to the photoluminescent peak wavelength of the given quantum dot composite.

In the color filter of an embodiment, the quantum dot composite may show, e.g., exhibit, a difference between a first peak wavelength measured for light at a wavelength of about 510 nm and a first peak wavelength measured for light at a wavelength of about 560 nm may be less than or equal to about 10 nm, less than or equal to about 9 nm, less than or equal to about 8 nm, less than or equal to about 7 nm, or less than or equal to about 6 nm.

In a normalized photoluminescence excitation intensity spectroscopy analysis of the quantum dot composite, a difference between a first peak valley depth of a photoluminescent excitation spectrum at a wavelength of about 560 nm and a first peak valley depth of a photoluminescent excitation spectrum at a wavelength of about 510 nm may be greater than or equal to about 0.15.

In a normalized photoluminescence excitation intensity spectroscopy analysis of the quantum dot composite, a difference between a first peak valley depth of a photoluminescent excitation spectrum at a wavelength of about 560 nm and a first peak valley depth of a photoluminescent excitation spectrum at a wavelength of about 510 nm may be greater than or equal to about 0.18, for example, greater than or equal to about 0.20.

In an embodiment, the quantum dot composite included in the color filter may have a light conversion of greater than or equal to about 30%, greater than or equal to about 31%, greater than or equal to about 32%, greater than or equal to about 33%, or greater than or equal to about 34%, and less than or equal to about 100%, less than or equal to about 80%, less than or equal to about 50%, or less than or equal to about 40%, for example, upon excitation with light having a wavelength of about 450 nm or about 465 nm and/or for example at room temperature or a temperature of about 80° C.

The first quantum dots or the second quantum dots may have a quantum efficiency (or a quantum yield) of greater than or equal to about 60%, greater than or equal to about 70%, greater than or equal to about 80%, greater than or equal to about 81%, greater than or equal to about 82%, greater than or equal to about 83%, greater than or equal to about 84%, or greater than or equal to about 85%. The quantum dot may have a full width at half maximum (FWHM) of less than or equal to about 55 nm, for example, less than or equal to about 50 nm, less than or equal to about 45 nm, less than or equal to about 44 nm, less than or equal to about 43 nm, less than or equal to about 42 nm, less than or equal to about 41 nm, or less than or equal to about 40 nm. The quantum dot may have a full width at half maximum (FWHM) of greater than or equal to about 5 nm, for example, greater than or equal to about 10 nm, greater than or equal to about 15 nm, or greater than or equal to about 18 nm.

In an embodiment, the color filter may be prepared by preparing two or more different quantum dot populations having average sizes (and particle size distributions) sufficiently different one another and emitting light of substantially the same color, mixing the two or more prepared quantum dot populations optionally together with other component(s) for the matrix to form a composition, and conducting a film forming or pattern forming process using the prepared composition which is described in detail herein.

The quantum dot populations may include the first quantum dot population and the second quantum dot population. Each of the first quantum dot population and the second quantum dot population may be prepared by a colloidal synthesis, respectively. Thus, the plurality of quantum dots may include an organic ligand, the organic solvent, or a combination thereof which will be described herein, on its surface. The organic ligand, the organic solvent, or the combination thereof may be bound to the surfaces of the quantum dots.

In an embodiment, the first quantum dots may be prepared by preparing a semiconductor nanocrystal core including indium (In) and phosphorus (P), and optionally zinc; and reacting a zinc shell precursor and a selenium precursor, a sulfur precursor, or a combination thereof in the presence of the core and a first organic ligand (e.g., in an organic solvent) simultaneously (collectively) or sequentially to form a semiconductor nanocrystal shell including zinc, selenium, and sulfur on the semiconductor nanocrystal core.

The forming of the shell may include heating a mixture including a zinc shell precursor, a first organic ligand, and an organic solvent; injecting the semiconductor nanocrystal core into the heated mixture, and injecting a selenium precursor and a sulfur precursor to form a shell having a desired composition (for example, independently once or more or twice or more) to perform a reaction. The injection method of each precursor is not particularly limited, and may be performed simultaneously (collectively) or sequentially. The forming of the shell may include forming a first semiconductor nanocrystal shell including zinc, sulfur, and selenium on the semiconductor nanocrystal core and forming a second semiconductor nanocrystal shell including zinc and sulfur, and selenium as desired, on the first semiconductor nanocrystal shell.

In an embodiment, the second quantum dots may be prepared by:

heating a mixture including a zinc precursor, an organic ligand, and an organic solvent;

adding the core and a selenium precursor to the heated mixture and then heating the same at a reaction temperature for at least about 40 minutes, for example, at least about 50 minutes to a ZnSe shell including zinc and selenium formed on the core; and adding a sulfur containing precursor (e.g., a stock solution including the sulfur containing precursor) into the mixture at the reaction temperature and carrying out a reaction to form a ZnS shell on the ZnSe shell.

During the formation of the shell, an amount of each of the precursors (e.g., the zinc precursor, the selenium precursor, the sulfur precursor, or a combination thereof) may be controlled so that each of the resulting quantum dot populations may have a desired shell composition and structure together with a particle size and a distribution thereof.

The preparing of the semiconductor nanocrystal core may include heating an indium compound in the presence of a second organic ligand and an organic solvent to prepare an indium precursor solution; and injecting a phosphorus precursor into the indium precursor solution and heating the obtained mixture. The method may further include obtaining a zinc precursor prior to preparing an indium precursor solution, and preparing the indium precursor solution in the presence of the zinc precursor. Depending on the types, the zinc precursor may be obtained by heating a zinc compound and an organic ligand at a high temperature (for example, a temperature of greater than or equal to about 100° C. and less than or equal to about 200° C.) in an organic solvent. During the core synthesis, a mole ratio of zinc to indium may be greater than or equal to about 1:1, greater than or equal to about 1.1:1, or greater than or equal to about 1.2:1, and less than or equal to about 3:1, less than or equal to about 2.5:1, or less than or equal to about 2:1.

In an embodiment, the zinc precursor and the indium precursor may include a carboxylate moiety. A mole amount of the carboxylic acid-containing organic ligand relative to 1 mole of the metal in the zinc precursor (or the indium precursor) may be greater than or equal to about 1 mole, greater than or equal to about 1.5 moles, or greater than or equal to about 2 moles, and less than or equal to about 5 moles, less than or equal to about 4 moles, or less than or equal to about 3 moles.

The types of zinc precursor or zinc shell precursor (hereinafter referred to as zinc precursor) are not particularly limited and may be appropriately selected. For example, the zinc precursor may be a Zn metal powder, an alkylated Zn compound, Zn alkoxide, Zn carboxylate, Zn nitrate, Zn perchlorate, Zn sulfate, Zn acetylacetonate, Zn halide, Zn cyanide, Zn hydroxide, Zn oxide, Zn peroxide, or a combination thereof. The zinc precursor may be dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, and the like. The zinc precursors may be used alone or in combination of two or more, e.g., two or more different zinc precursors may be used.

The (first, second, or a combination thereof) organic ligand may include RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, RHPOOH, $R_2POOH$ (wherein, R and R' are independently a C1 to C40 (or a C3 to C24) aliphatic hydrocarbon group (e.g., alkyl group, alkenyl group alkynyl group), or a C6 to C40 (or a C6 to C24) aromatic hydrocarbon group (e.g., a C6 to C20 aryl group)), or a combination thereof. The organic ligand may coordinate, e.g., bind to, the surface of the obtained nanocrystal and may improve upon the dispersion of nanocrystal in the solution, effect the light emitting and electrical characteristics of the quantum dots, or a combination thereof. Examples of the organic ligand may include methane thiol, ethane thiol, propane thiol, butane thiol, pentane thiol, hexane thiol, octane thiol, dodecane thiol, hexadecane thiol, octadecane thiol, or benzyl thiol; methane amine, ethane amine, propane amine, butyl amine, pentyl amine, hexyl amine, octyl amine, dodecyl amine, hexadecyl amine, octadecyl amine, dimethyl amine, diethyl amine, or dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine such as a substituted or unsubstituted methyl phosphine (e.g., trimethyl phosphine, methyldiphenyl phosphine, etc.), a substituted or unsubstituted ethyl phosphine (e.g., triethyl phosphine, ethyldiphenyl phosphine, etc.), a substituted or unsubstituted propyl phosphine, a substituted or unsubstituted butyl phosphine, a substituted or unsubstituted pentyl phosphine, a substituted or unsubstituted octylphosphine (e.g., trioctylphosphine (TOP)), and the like; a phosphine oxide such as a substituted or unsubstituted methyl phosphine oxide (e.g., trimethyl phosphine oxide, methyldiphenyl phosphine oxide, etc.), a substituted or unsubstituted ethyl phosphine oxide (e.g., triethyl phosphine oxide, ethyldiphenyl phosphine oxide, etc.), a substituted or unsubstituted propyl phosphine oxide, a substituted or unsubstituted butyl phosphine oxide, a substituted or unsubstituted octylphosphine oxide (e.g., trioctylphosphine oxide (TOPO)), and the like; diphenyl phosphine, triphenyl phosphine compound, or an oxide compound thereof; phosphonic acid, a C5 to C20 alkylphosphinic acid such as hexylphosphinic acid, octylphosphinic acid, dodecanephosphinic acid, tetradecanephosphinic acid, hexadecanephosphinic acid, or octadecanephosphinic acid, or a C5 to C20 alkyl phosphonic acid but is not limited thereto. The organic ligand may be used alone or as a mixture of two or more, e.g., two or more different organic ligands may be used.

The organic solvent may be, for example, a C6 to C22 primary amine such as hexadecylamine; a C6 to C22 secondary amine such as dioctylamine; a C6 to C40 tertiary amine such as trioctylamine; a nitrogen-containing heterocyclic compound such as pyridine; a C6 to C40 aliphatic hydrocarbon (e.g., alkane, alkene, alkyne, etc.) such as hexadecane, octadecane, octadecene, or squalane; a C6 to C30 aromatic hydrocarbon such as phenyldodecane, phenyltetradecane, or phenyl hexadecane; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether, or benzyl ether, or a combination thereof. Types and amounts of the solvent may be appropriately selected taking into consideration precursors and organic ligands.

The type of the indium compound is not particularly limited and may be appropriately selected. The indium precursor may include an indium powder, alkylated indium compound, indium alkoxide, indium carboxylate, indium nitrate, indium perchlorate, indium sulfate, indium acetylacetonate, indium halide, indium cyanide, indium hydroxide, indium oxide, indium peroxide, indium carbonate, or a combination thereof. The indium precursor may include an indium carboxylate such as indium oleate and indium myristate, indium acetate, indium hydroxide, indium chloride, indium bromide, and indium iodide. The forming of the indium precursor may be performed under vacuum at a temperature of greater than or equal to about 100° C., for example, greater than or equal to about 120° C., and less than or equal to about 200° C.

The type of the phosphorus precursor is not particularly limited and may be appropriately selected. The phosphorus precursor may include tris(trimethylsilyl) phosphine, tris(dimethylamino)phosphine, triethylphosphine, tributylphosphine, trioctylphosphine, triphenylphosphine, tricyclohexylphosphine, dimethylaminophosphine, diethylaminophosphine, or a combination thereof.

The mixture obtained by injecting the phosphorus precursor during the core formation process may be heated to a temperature of greater than or equal to about 150° C., greater than or equal to about 200° C., greater than or equal to about 250° C., or greater than or equal to about 270° C. and less than or equal to about 300° C., less than or equal to about 290° C., less than or equal to about 280° C., less than or equal to about 270° C., or less than or equal to about 260° C. In the core formation process a precursor, e.g., one or more of the precursors (e.g., an indium precursor, a phosphorus precursor, a zinc precursor, or a combination thereof), may be additionally injected once or more as desired.

The core formation reaction time is not particularly limited, and may be appropriately selected in consideration of reactivity between precursors and core formation temperature.

The type of the selenium precursor is not particularly limited and may be appropriately selected. For example, the selenium precursor may be selenium-trioctylphosphine (Se-TOP), selenium-tributylphosphine (Se-TBP), selenium-triphenylphosphine (Se-TPP), selenium-diphenylphosphine (Se-DPP), or a combination thereof. The selenium precursor may be injected once or more (e.g., two or more times).

The type of the sulfur precursor is not particularly limited and may be appropriately selected. The sulfur precursor injected for shell formation (first shell formation and second shell formation, etc.) may include two or more different compounds. In an embodiment, for forming a shell, a thiol compound and an additional sulfur precursor (e.g., a precursor including an elemental sulfur dispersed in an organic solvent) may be used. In an embodiment, for the first quantum dots, a thiol compound and optionally an additional sulfur precursor may be used to form a shell. In an embodiment, for the second quantum dots, a thiol compound may not be used for the shell formation.

In an embodiment, the sulfur precursor for forming the first shell may include a thiol compound (e.g., a thiol compound having a C4 to C20 aliphatic hydrocarbon group such as alkanethiol, e.g., dodecanethiol, and the sulfur precursor for forming the second shell may be an organic solvent dispersion of sulfur powders (e.g., sulfur-octadecene (S-ODE), sulfur-trioctylphosphine (S-TOP), sulfur-tributylphosphine (S-TBP), sulfur-triphenylphosphine (S-TPP), sulfur-trioctylamine (S-TOA), or trimethylsilyl sulfur), mercapto propyl silane, trimethylsilyl sulfide, ammonium sulfide, sodium sulfide, or a combination thereof. The sulfur precursor may be injected one or more times (e.g., two or more times) as desired.

A shell forming temperature may be appropriately selected. In an embodiment, the shell forming temperature may be greater than or equal to about 270° C., greater than or equal to about 280° C., greater than or equal to about 290° C., greater than or equal to about 300° C., greater than or equal to about 310° C., or greater than or equal to about 315° C. In an embodiment, the shell forming temperature may be less than or equal to about 350° C., less than or equal to about 340° C., less than or equal to about 330° C., or less than or equal to about 325° C.

A shell forming reaction time is not particularly limited and may be appropriately selected. For example, the shell forming reaction may be performed, for example, for greater than or equal to about 20 minutes, greater than or equal to about 25 minutes, greater than or equal to about 30 minutes, greater than or equal to about 35 minutes, greater than or equal to about 40 minutes, greater than or equal to about 45 minutes, greater than or equal to about 50 minutes, greater than or equal to about 55 minutes, or greater than or equal to about 1 hour, but is not limited thereto. The shell forming reaction time may be less than or equal to about 3 hours.

Each precursor/compound may be added in a single step or over a plurality of times. When adding each precursor in a stepwise manner, the reaction may be performed for a predetermined time (e.g., greater than or equal to about 5 minutes, greater than or equal to about 10 minutes, or greater than or equal to about 15 minutes) in each step. The reaction may be performed under an inert gas atmosphere, air, or under vacuum, but is not limited thereto.

In the first shell formation, the selenium precursor may be added once or more (e.g., two or more times or three or more times, etc.). Depending on the composition of the shell, the second shell formation may proceed in the presence or absence of a selenium precursor.

When the shell forming process includes forming the first shell and forming the second shell, each reaction time may be appropriately selected depending on the desired shell composition, the type of precursor, and the reaction temperature. The shell formation (or first shell formation and second shell formation) may be (e.g., independently) performed for greater than or equal to about 40 minutes, greater than or equal to about 50 minutes, greater than or equal to about 60 minutes, greater than or equal to about 70 minutes, greater than or equal to about 80 minutes, or greater than or equal to about 90 minutes. A reaction time for shell formation (or first shell formation, second shell formation, or a combination thereof) may be (e.g., independently) less than or equal to about 4 hours, less than or equal to about 3 hours, less than or equal to about 2 hours, less than or equal to about 1 hour, or less than or equal to about 30 minutes.

When forming a shell or a multi-layered shell, an amount of the selenium precursor relative to indium in a reaction system (e.g., for forming shell or the first shell) may be adjusted to form a shell or a first semiconductor nanocrystal shell having a predetermined thickness for a predetermined reaction time. The amount of the selenium precursor relative to indium in the reaction system (e.g., for forming the shell or the first shell), that is, an amount of selenium in moles per 1 mole of indium may be greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles and less than or equal to about 20 moles, less than or equal to about 18 moles, or less than or equal to about 15 moles.

If present, an amount of the thiol precursor per 1 mole of indium in the reaction system at the time of shell formation (e.g., initial shell formation reaction or first shell formation) may be greater than or equal to about 0.5 moles, greater than or equal to about 1 mole, greater than or equal to about 1.5 moles, or greater than or equal to about 2 moles and less than or equal to about 15 moles, less than or equal to about 10 moles, less than or equal to about 9 moles, less than or equal to about 6 moles, less than or equal to about 4 moles, or less than or equal to about 3 moles.

In an embodiment, the reaction system for forming the second shell may not include a selenium precursor.

In an embodiment, an amount of the sulfur precursor (e.g., an organic solvent dispersion of elemental sulfur) relative to 1 mole of indium in the shell forming (or the second shell forming) reaction system may be such that the desired shell composition may be obtained (in consideration of reactivity and reaction temperature of the precursors). For example, the amount of the sulfur precursor relative to 1 mole of indium in the shell forming (e.g., second shell) reaction system may be greater than or equal to about 2 moles, greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles and less than or equal to about 45 moles, less than or equal to about 40 moles, less than or equal to about 35 moles, less than or equal to about 30 moles, less than or equal to about 25 moles, less than or equal to about 20 moles, less than or equal to about 19 moles, less than or equal to about 18 moles, less than or equal to about 16 moles, less than or equal to about 15 moles, less than or equal to about 14 moles, less than or equal to about 13 moles, less than or equal to about 12 moles, less than or equal to about 11 moles, less than or equal to about 10 moles, less than or equal to about 9 moles, less than or equal to about 8 moles, less than or equal to about 7 moles, less than or equal to about 6 moles, or less than or equal to about 5 moles.

A non-solvent may be added into the obtained final reaction solution to precipitation of the quantum dots, the organic ligand-coordinated nanocrystals may then be separated (e.g., by filtration or centrifugation). The nonsolvent may be a polar solvent that is miscible with the solvent used in the reaction and the nanocrystals may be precipitated out (e.g., not-dispersible) therein. The nonsolvent may be selected depending on the solvent used in the reaction and may be for example, acetone, ethanol, butanol, isopropanol, ethanediol, water, tetrahydrofuran (THF), dimethylsulfoxide (DMSO), diethylether, formaldehyde, acetaldehyde, a solvent having a similar solubility parameter to the foregoing solvents, or a combination thereof. The separation may be performed through a centrifugation, precipitation, chromatography, or distillation. The separated nanocrystals may be added to a washing solvent and washed, if desired. The washing solvent has no particular limit and may have a similar solubility parameter to that of the organic ligand and may, for example, include hexane, heptane, octane, chloroform, toluene, benzene, and the like.

The quantum dots may be dispersed in a dispersion solvent. The quantum dots may form an organic solvent dispersion. The organic solvent dispersion may not include water, an organic solvent miscible with water, or a combination thereof. The dispersion solvent may be appropriately selected. The dispersion solvent may include the aforementioned organic solvent. The dispersion solvent may include a substituted or unsubstituted C1 to C40 aliphatic hydrocarbon, a substituted or unsubstituted C6 to C40 aromatic hydrocarbon, or a combination thereof.

In an embodiment, the color filter may be prepared by preparing a composition that may include the aforementioned plurality of the quantum dots (e.g., including the first quantum dot population and the second quantum dot population); an (organic) solvent, a liquid vehicle, or a combination thereof; and optionally a monomer, a dispersing agent, or a combination thereof; and carrying out a pattern forming process (e.g., in a photolithography or an ink-jet manner) with the composition.

The dispersing agent may disperse the quantum dots. The dispersing agent may include a carboxylic acid group-containing compound (e.g., a monomer or a polymer). The composition may further include a (photo) polymerizable monomer including a carbon-carbon double bond, and optionally (thermal or photo) initiator. The composition may have photosensitivity.

Details of the quantum dots in the composition are as described herein. An amount of the plurality of the quantum dots in the composition may be appropriately adjusted in view of the desired end use (e.g., a color filter, etc.).

In an embodiment, the amount of the plurality of the quantum dot may be greater than or equal to about 1 weight percent (wt %), for example, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %, based on a solid content of composition. The amount of the plurality of the quantum dots may be less than or equal to about 70 wt %, for example, less than or equal to about 65 wt %, less than or equal to about 60 wt %, less than or equal to about 55 wt %, less than or equal to about 50 wt %, less than or equal to about 40 wt %, less than or equal to about 35 wt %, less than or equal to about 30 wt %, or less than or equal to about 25 wt %, based on a solid content of the composition. The weight percentage of the components relative to the total solids content in the composition may represent the contents of the components in the composite, which will be described herein.

The plurality of the quantum dots may be prepared by mixing the aforementioned first quantum dot population and the aforementioned second quantum dot population. A mixing ratio between the first and the second quantum dot population may be selected taking into consideration a desired particle size distribution and desired optical properties of the quantum dot composite. In an embodiment, the mixing ratio (wt:wt) between the first and the second quantum dot population may be from about 1:99 to about 99:1, from about 10:90 to about 90:10, from about 20:80 to about 80:20, from about 25:75 to about 75:25, from about 30:70 to about 70:30, from about 40:60 to about 60:40, about 50:50, or a combination thereof.

In the composition of an embodiment, the dispersing agent may contribute to dispersing the quantum dots. In an embodiment, the dispersing agent may be a carboxylic acid group containing organic compound (e.g., a monomer or a polymer). The dispersing agent may be an insulating polymer.

The carboxylic acid group-containing organic compound may include a monomer combination or a copolymer thereof, the monomer combination including a first monomer including a carboxylic acid group and a carbon-carbon double bond, a second monomer having a carbon-carbon double bond, a hydrophobic moiety, or a combination thereof, and a second monomer not including a carboxylic acid group, and optionally a third monomer including a carbon-carbon double bond and a hydrophilic moiety and not including a carboxylic acid group;

a multiple aromatic ring-containing polymer having a backbone structure in which two aromatic rings are bound to a quaternary carbon atom that is a constituent atom of another cyclic moiety in the main chain and including a carboxylic acid group (—COON) (hereinafter, cardo binder);

or a combination thereof.

The dispersing agent may include the first monomer, the second monomer, and optionally the third monomer.

In the composition, an amount of the dispersing agent may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt %, based on a total weight or a solid content of the composition, but is not limited thereto. The amount of the dispersing agent may be less than or equal to about 35 wt %, for example less than or equal to about 33 wt %, or less than or equal to about 30 wt %, based on a total weight or a solid content of the composition. The amount of the dispersing agent may be about 0.5 wt % to about 55 wt %, based on a total weight of a solid content of the composition.

In an embodiment, the composition may include the polymerizable (e.g., photopolymerizable) monomer (hereinafter, may be referred to as "monomer") including the carbon-carbon double bond, and the monomer may include (e.g., photopolymerizable) (meth)acryl-based, i.e., (meth) acryl-containing, monomer. The monomer may be a precursor for an insulating polymer.

An amount of the monomer may be greater than or equal to about 0.5 wt %, for example, greater than or equal to about 1 wt %, or greater than or equal to about 2 wt %, based on a total weight or a total solid content of the composition. The amount of the monomer may be less than or equal to about 30 wt %, for example, less than or equal to about 28 wt %, less than or equal to about 25 wt %, less than or equal to about 23 wt %, less than or equal to about 20 wt %, less than or equal to about 18 wt %, less than or equal to about 17 wt %, less than or equal to about 16 wt %, or less than or equal to about 15 wt %, based on a total weight or a total solid content of the composition.

The (photo)initiator included in the composition is a compound that initiates (photo)polymerization of the aforementioned monomers in the composition. The initiator is a compound accelerating a radical reaction (e.g., radical polymerization of monomer) by producing radical chemical species under a mild condition (e.g., by heat or light). The initiator may be a thermal initiator or a photoinitiator. The initiator is not particularly limited and may be appropriately selected.

In the composition, an amount of the initiator may be appropriately adjusted taking into consideration types and amounts of the polymerizable monomers. In an embodiment, the amount of the initiator may be greater than or equal to about 0.01 wt %, for example, greater than or equal to about 1 wt % and less than or equal to about 10 wt %, for example, less than or equal to about 9 wt %, less than or equal to about 8 wt %, less than or equal to about 7 wt %, less than or equal to about 6 wt %, or less than or equal to about 5 wt %, based on a total weight (or a total weight of the solid content) of the composition, but is not limited thereto.

The composition (or the polymer matrix) may further include a poly- or monothiol compound having a, e.g., at least one, thiol group (or a reaction product of the thiol compound and the monomer), a metal oxide particulate, or a combination thereof.

The metal oxide fine particle may include $TiO_2$, $SiO_2$, $BaTiO_3$, $Ba_2TiO_4$, ZnO, or a combination thereof. In the composition, an amount of the metal oxide fine particle may be greater than or equal to about 1 wt %, greater than or equal to about 5 wt %, or greater than or equal to about 10 wt % and less than or equal to about 50 wt %, less than or equal to about 40 wt %, less than or equal to about 30 wt %, less than or equal to about 25 wt %, less than or equal to about 20 wt %, less than or equal to about 15 wt %, less than or equal to about 10 wt %, or less than or equal to about 5 wt %, based on a total weight (or a solid content thereof) of the composition. The metal oxide fine particle may be non-emissive.

The metal oxide fine particle may have an appropriately selected diameter without a particular limit. The diameter of the metal oxide fine particle may be greater than or equal to about 100 nm, for example, greater than or equal to about 150 nm, or greater than or equal to about 200 nm and less than or equal to about 1,000 nm or less than or equal to about 800 nm.

The thiol compound may be a dithiol compound, a trithiol compound, a tetrathiol compound, or a combination thereof. For example, the thiol compound may be glycoldi-3-mercaptopropionate (e.g., ethylene glycol di-3-mercaptopropionate), glycoldimercaptoacetate (e.g., ethylene glycol dimercaptoacetate), trimethylolpropane-tris(3-mercaptopropionate), pentaerythritol tetrakis(3-mercaptopropionate), pentaerythritol tetrakis(2-mercaptoacetate), 1,6-hexanedithiol, 1,3-propanedithiol, 1,2-ethanedithiol, polyethylene glycol dithiol including 1 to 10 ethylene glycol repeating units, or a combination thereof.

An amount of the thiol compound may be less than or equal to about 50 wt %, less than or equal to about 40 wt %, less than or equal to about 30 wt %, less than or equal to about 20 wt %, less than or equal to about 10 wt %, less than or equal to about 9 wt %, less than or equal to about 8 wt %, less than or equal to about 7 wt %, less than or equal to about 6 wt %, or less than or equal to about 5 wt %, based on a total weight (or a total weight of the solid content) of the composition. The amount of the thiol compound may be greater than or equal to about 0.1 wt %, for example, greater than or equal to about 0.5 wt %, greater than or equal to about 1 wt %, greater than or equal to about 5 wt %, greater than or equal to about 10 wt %, or greater than or equal to about 15 wt %, based on a total weight (or a total weight of the solid content) of the composition.

The composition may further include an organic solvent (or a liquid vehicle, hereinafter referred to as a solvent). Types of the usable organic solvent are not particularly limited.

The composition may further include an organic solvent (or a liquid vehicle, hereinafter referred to as a solvent). Types of the usable organic solvent are not particularly limited. Examples of the solvent may include, but are not limited to: ethyl 3-ethoxy propionate; an ethylene glycol series such as ethylene glycol, diethylene glycol, or polyethylene glycol; a glycol ether series such as ethylene glycol monomethyl ether, ethylene glycol monoethyl ether, diethylene glycol monomethyl ether, ethylene glycol diethyl ether, or diethylene glycol dimethyl ether; a glycol ether acetate series such as ethylene glycol monomethyl ether acetate, ethylene glycol monoethyl ether acetate, diethylene glycol monoethyl ether acetate, or diethylene glycol monobutyl ether acetate; a propylene glycol series such as propylene glycol; a propylene glycol ether series such as propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, or dipropylene glycol diethyl ether; a propylene glycol ether acetate series such as propylene glycol monomethyl ether acetate or dipropylene glycol monoethyl ether acetate; an amide series such as N-methylpyrrolidone, dimethyl formamide, or dimethyl acetamide; a ketone series such as methyl ethyl ketone (MEK), methyl isobutyl ketone (MIBK), or cyclohexanone; a petroleum product such as toluene, xylene, or solvent naphtha; an ester series such as ethyl acetate, propyl acetate, butyl acetate, cyclohexyl acetate, or ethyl lactate; an ether such as diethyl ether, dipropyl ether, or dibutyl ether; chloroform, a C1 to C40 aliphatic hydrocarbon (e.g., alkane, alkene, or alkyne), a halogen (e.g., chloro) substituted C1 to C40 aliphatic hydrocarbon group (e.g., dichloroethane, trichloromethane, or the like), a C6 to C40 aromatic hydrocarbon (e.g., toluene, xylene, or the like), a halogen (e.g., chloro) substituted C6 to C40 aromatic hydrocarbon, or a combination thereof.

Types and amounts of the solvent may be appropriately selected by taking into consideration the aforementioned main components (i.e., the quantum dot, the dispersing agent, the photopolymerizable monomer, the photoinitiator, and if used, the thiol compound), and types and amounts of additives which will be described herein. The composition may include a solvent in a residual amount except for a desired amount of the solid content (non-volatile components).

The composition (e.g., an ink composition or an ink jet composition) may have a viscosity at 25° C. of greater than or equal to about 4 centiPoise (cPs), greater than or equal to about 5 cPs, greater than or equal to about 5.5 cPs, greater than or equal to about 6.0 cPs, or greater than or equal to about 7.0 cPs. The composition (e.g., an ink composition or an ink jet composition) may have a viscosity at 25° C. of less than or equal to about 12 cPs, less than or equal to about 10 cPs, or less than or equal to about 9 cPs.

In an embodiment, the composition may be applied in an ink jet process, and the ink composition may have a surface tension (for example, at 23° C.) of greater than or equal to about 21 milliNewtons per meter (mN/m), greater than or equal to about 22 mN/m, greater than or equal to about 23 mN/m, greater than or equal to about 24 mN/m, greater than or equal to about 25 mN/m, greater than or equal to about 26 mN/m, greater than or equal to about 27 mN/m, greater than or equal to about 28 mN/m, greater than or equal to about 29 mN/m, greater than or equal to about 30 mN/m, or greater than or equal to about 31 mN/m and less than or equal to about 40 mN/m, less than or equal to about 39 mN/m, less than or equal to about 38 mN/m, less than or equal to about 37 mN/m, less than or equal to about 36 mN/m, less than or equal to about 35 mN/m, less than or equal to about 34 mN/m, less than or equal to about 33 mN/m, or less than or equal to about 32 mN/m. A surface tension of the ink composition may be less than or equal to about 31 mN/m, less than or equal to about 30 mN/m, less than or equal to about 29 mN/m, or less than or equal to about 28 mN/m.

In an embodiment, the composition may further include an additive such as a light diffusing agent, a leveling agent, or a coupling, that can be used for a photoresist composition or an ink composition.

The composition according to an embodiment may be prepared by a method including preparing quantum dot dispersion including the aforementioned quantum dots, a dispersing agent, and optionally a solvent; and mixing the quantum dot dispersion with the initiator, the polymerizable monomer (e.g., an acryl-based, i.e., acryl-containing monomer), optionally, the thiol compound, optionally, the metal oxide particulates, and optionally, the aforementioned additive. Each of the aforementioned components may be mixed sequentially or simultaneously, but mixing orders are not particularly limited.

In an embodiment, the composition may provide a quantum dot-polymer composite by a (e.g., radical) polymerization. The composition according to an embodiment may be a photoresist composition including quantum dots applicable to a photolithography method. The composition according to an embodiment may be an ink composition that may provide a pattern by printing (e.g., a droplet discharge method such as inkjet printing). If the composition is applied in an ink jet process, the composition may be discharged onto a substrate at room temperature and may form a quantum dot polymer composite or a pattern of quantum dot polymer composite, for example, by heating.

In an embodiment, the quantum dot (polymer) composite includes a matrix (e.g., a polymer matrix); and the aforementioned plurality of the quantum dots dispersed in the matrix. The quantum dot polymer composite may further include the metal oxide fine particle dispersed in the matrix. The (polymer) matrix may include a linear polymer (i.e., an uncrosslinked polymer where branching (e.g., side chains) may or may not be present), a crosslinked polymer, or a combination thereof. The crosslinked polymer may include a thiolene resin, crosslinked poly(meth)acrylate, crosslinked polyurethane, a crosslinked epoxy resin, a crosslinked vinyl polymer, a crosslinked silicone resin, or a combination thereof. The linear polymer may include a repeating unit derived from carbon-carbon unsaturated bonds (e.g., carbon-carbon double bond). The repeating unit may include a carboxylic acid group. The linear polymer may include an ethylene repeating unit.

The matrix may include a dispersing agent (e.g., a binder monomer or polymer including a carboxylic acid group), a polymerization product (e.g., insulating polymer) of a polymerizable monomer having a carbon-carbon double bond (a, e.g., at least one, for example, at least two, at least three, at least four, or at least five), optionally a polymerization product of the polymerizable monomer and a thiol compound (e.g., a polythiol compound having at least two thiol groups for example, at a terminal end thereof), or a combination thereof.

In an embodiment, the polymer matrix may include a linear polymer, a crosslinked polymer, or a combination thereof. The cross-linked polymer may include a thiolene resin, a cross-linked poly(meth)acrylate, or a combination thereof. In an embodiment, the cross-linked polymer may be a polymerization product of the polymerizable monomer and, optionally, a polythiol compound having at least two thiol groups (e.g., at a terminal end thereof). The quantum dot, the dispersing agent, or the binder polymer, the polymerizable monomer, and the polythiol compound may be the same as described herein.

A film of the quantum dot-polymer composite (or a pattern thereof as described herein) may have for example a thickness of less than or equal to about 30 micrometers (μm), for example, less than or equal to about 25 μm, less than or equal to about 20 μm, less than or equal to about 15 μm, less than or equal to about 10 μm, less than or equal to about 8 μm, or less than or equal to about 7 μm and greater than or equal to about 2 μm, for example, greater than or equal to about 3 μm, greater than or equal to about 3.5 μm, greater than or equal to about 4 μm, greater than or equal to about 5 μm, greater than or equal to about 6 μm, greater than or equal to about 7 μm, greater than or equal to about 8 μm, greater than or equal to about 9 μm, greater than or equal to about 10 μm, greater than or equal to about 11 μm, greater than or equal to about 12 μm, greater than or equal to about 13 μm, greater than or equal to about 14 μm, or greater than or equal to about 15 μm.

In an embodiment, the color filter may include a patterned film of the quantum dot composite, and the patterned film may include a, e.g., at least one, repeating section configured to emit predetermined light. In an embodiment, the repeating section may include a first section configured to emit a first light. The repeating section may further include a second section emitting a second light having different wavelength from the first light. The first section, the second section, or a combination thereof may include the aforementioned quantum dot (polymer) composite. The first light or the second light may be red light having a maximum photoluminescence peak wavelength that is between about 600 nm and about 650 nm (e.g., about 620 nm to about 650 nm), or green light having a maximum photoluminescence peak wavelength that is between about 500 nm and about 550 nm (e.g., about 510 nm to about 540 nm). The patterned film may further include a third section that may pass or emit a third light (e.g., blue light) different from the first light and the second light. The third light may include an excitation light. The third light (or the excitation light) may include blue light having a maximum peak wavelength ranging from about 380 nm to about 480 nm and optionally green light.

In an embodiment, a patterned quantum dot composite film may be produced by a method using the photoresist composition. Non-limiting methods of forming the pattern are illustrated, referring to FIG. 2A. The method may include:

forming a film of the composition on a substrate;
optionally prebaking the film;
exposing a selected region of the film to light (e.g., a wavelength of less than or equal to about 400 nm); and
developing the exposed film with an alkali developing solution to obtain a pattern including the quantum dot-polymer composite.

The composition may be coated to have a predetermined thickness on a substrate in an appropriate method of spin coating, slit coating, and the like. The formed film may be, optionally, pre-baked (PRB). The pre-baking may be performed by selecting appropriate conditions of temperature, time, atmosphere, and the like.

Figure 2A:
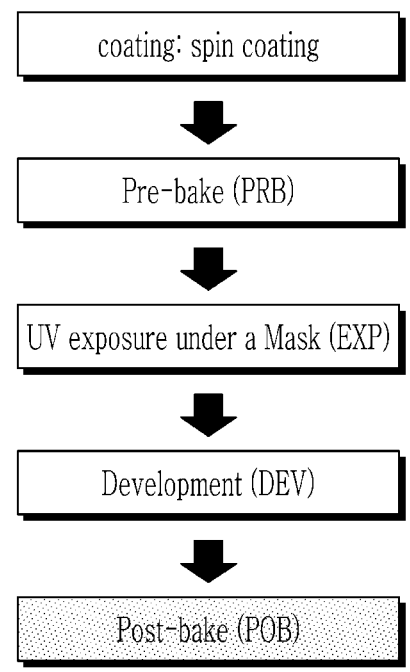
FIG. 2B schematically represents a process (e.g., an ink jet process) of producing a quantum dot composite pattern using a composition according to an embodiment.
Figure 2A:
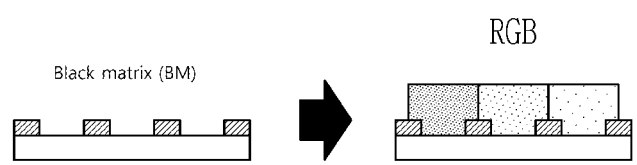

The formed (or optionally pre-baked) film may be exposed to light having a predetermined wavelength under a mask (e.g., a photomask for a photolithography process) having a predetermined pattern (EXP). A wavelength and intensity of the light may be selected by taking into consideration the initiator (e.g., photoinitiator), an amount of the initiator (e.g., photoinitiator), the quantum dots, amounts of the quantum dots, and the like. In FIG. 2A, the BM denotes a black matrix and RGB represents a color section.

The exposed film may be treated with an alkali developing solution (e.g., dipping or spraying) to dissolve an unexposed region and obtain a desired pattern (DEV). The obtained pattern may be, optionally, post-baked (FOB) to improve crack resistance and solvent resistance of the pattern, for example, at about 150° C. to about 230° C. for a predetermined time (e.g., greater than or equal to about 10 minutes or greater than or equal to about 20 minutes).

In an embodiment in which the quantum dot-polymer composite pattern has a plurality of repeating sections, a quantum dot-polymer composite having a desired pattern may be obtained by preparing a plurality of compositions including a quantum dot having desired photoluminescence properties (a photoluminescence peak wavelength and the like) to form each repeating section (e.g., a red light emitting quantum dot, a green light emitting quantum dot, or optionally, a blue light emitting quantum dot) and an appropriate number of times (e.g., two or more times or three or more times) repeating a formation of the pattern about each composition. For example, the quantum dot-polymer composite may have, e.g., be provided in, a pattern including at least two repeating color sections (e.g., red/green/blue (RGB) sections). The quantum dot-polymer composite pattern may be used as a photoluminescence-type color filter in a display device.

Figure 2B:
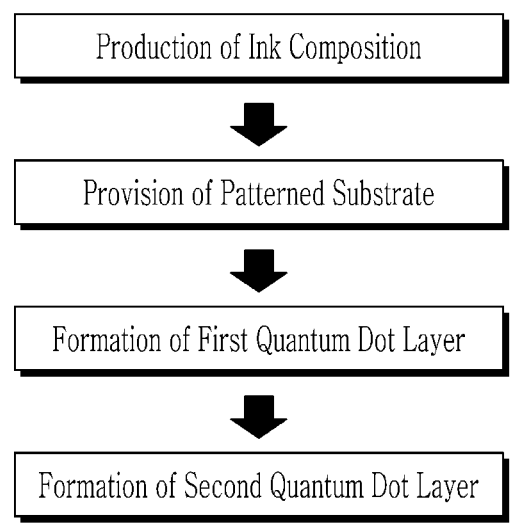

A quantum dot composite pattern may be formed by using an ink composition configured to form a pattern via an ink jet manner. Referring to FIG. 2B, the method includes preparing an ink composition; obtaining a substrate including a pattern of, for example, an electrode and optionally a pixel area formed by a bank; depositing an ink composition on the substrate (or the pixel area) to form a first quantum dot layer (or a first repeating section); and depositing an ink composition on the substrate (or the pixel area) to form a second quantum dot layer (or a second repeating section). Formation of the first quantum dot layer and the second quantum dot layer may be carried out simultaneously or sequentially.

Deposition of the ink composition may be carried out using an appropriate droplet discharging system such as an ink jet printer or a nozzle printing system (e.g., having an ink reservoir and a, e.g., at least one, printer head). The deposited ink composition may be heated to remove a solvent and optionally to carry out a polymerization, and thus, provide a (first or second) quantum dot layer. The method may provide a highly precise quantum dot-polymer composite film or pattern in a relatively simple way in a relatively short period of time.

The aforementioned color filter including the quantum dot composite (pattern) may be included in an electronic apparatus. Such an electronic apparatus may include a display device, a light emitting diode (LED), an organic light emitting diode (OLED), a quantum dot LED, a sensor, a solar cell, an imaging sensor, a photodetector, or a liquid crystal display device, but is not limited thereto. The aforementioned quantum dots may be included in an electronic apparatus. Such an electronic apparatus may include a portable terminal device, a monitor, a notebook personal computer (PC), a television, an electronic display, a camera, an automobile, and the like, but are not limited thereto. The electronic apparatus may be a portable terminal device including a display device (or light emitting device) including quantum dots, a monitor, a notebook PC, or a television. The electronic apparatus may be a camera or a portable terminal device including an image sensor including quantum dots. The electronic apparatus may be a camera or a vehicle including a photodetector including quantum dots.

The color filter may be a layered structure that further includes a (e.g., transparent) substrate, and the quantum dot composite (pattern) may be disposed on a surface of the substrate. In an embodiment, a first optical element, an incident (or excitation) light cutting element, an absorption type color filter, or a combination thereof may be disposed between the substrate and the quantum dot composite. In an embodiment, the color filter may include a red pixel, green pixel, and blue pixel and in each of the red pixel and the green pixel, a plurality of quantum dots may be included and the blue pixel may be configured to pass at least a portion of incident light (e.g., to pass blue light). Between the pixels, a black matrix (BM), a bank, or a combination thereof may be disposed e.g., for an optical isolation. (see FIG. 3)

The device (e.g., a display device or a light emitting device) may further include a light source. In the device, the light source may be an element emitting incident light. The light source may be configured to provide incident light to each pixel (e.g., a quantum dot composite) of the color filter. The incident or excitation light may include blue light and optionally green light. The light source may include an LED. The light source may include an organic LED (e.g., OLED). In an embodiment, on a front side (i.e., light emitting face) of the red pixel and the green pixel is disposed a first optical element cutting (e.g., absorbing or reflecting) blue light and optionally green light. The light source may include a blue light emitting OLED (organic light emitting diode) and a green light emitting OLED, and on the third section emitting or transmitting blue light is disposed an optical element that filters or removes green light.

The blue light from the light source may have a wavelength of greater than or equal to about 440 nm, greater than or equal to about 450 nm, greater than or equal to about 460 nm, greater than or equal to about 465 nm and less than or equal to about 500 nm, less than or equal to about 480 nm, less than or equal to about 470 nm, or less than or equal to about 460 nm. The green light from the light source may have a wavelength of greater than or equal to about 480 nm, greater than or equal to about 500 nm, greater than or equal to about 510 nm, greater than or equal to about 520 nm, or greater than or equal to about 530 nm. The green light from the light source may have a wavelength of less than or equal to about 580 nm, less than or equal to about 560 nm, less than or equal to about 540 nm, or less than or equal to about 535 nm.

In an embodiment, the light source includes a plurality of light emitting units respectively corresponding to the first section and the second section, and the light emitting units may include a first electrode and a second electrode each having a surface opposite the other and an electroluminescence layer disposed between the first electrode and the second electrode. The electroluminescence layer may include an organic light emitting material. For example, each light emitting unit of the light source may include an electroluminescent device (e.g., an organic light emitting diode (OLED)) configured to emit light of a predetermined wavelength (e.g., blue light, green light, or a combination thereof). Structures and materials of the electroluminescent device and the organic light emitting diode (OLED) are not particularly limited. The light source includes an organic light emitting diode (OLED) emitting blue light (and optionally, green light).

Figure 4A:
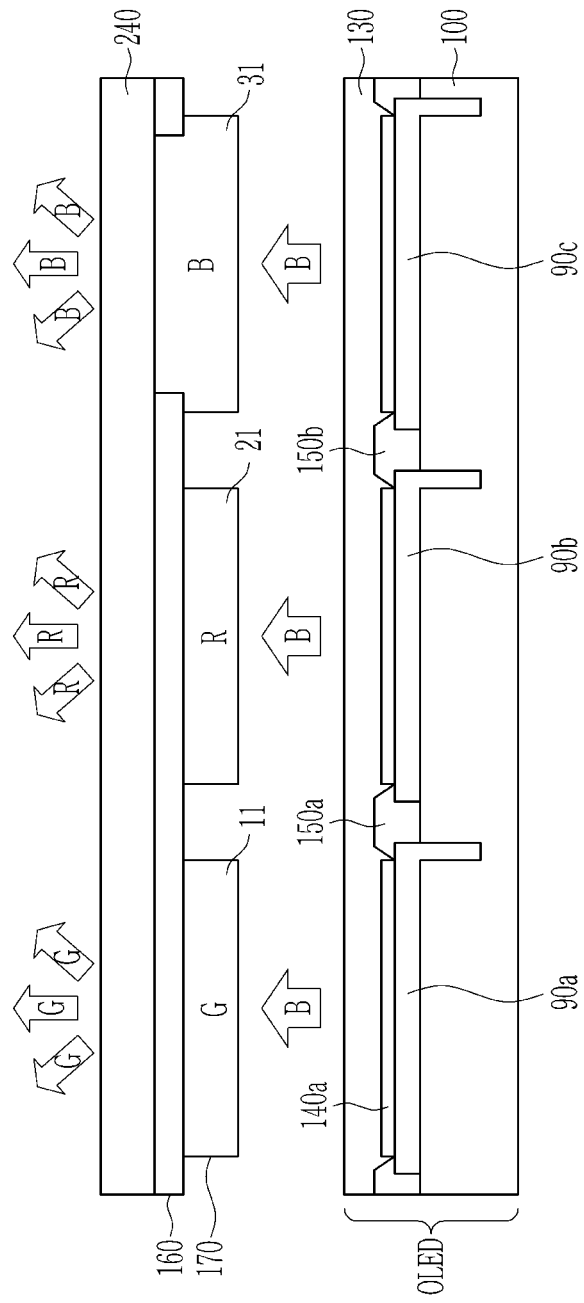
FIG. 4A is a schematic cross-sectional view of a display device according to an embodiment.
Figure 4B:
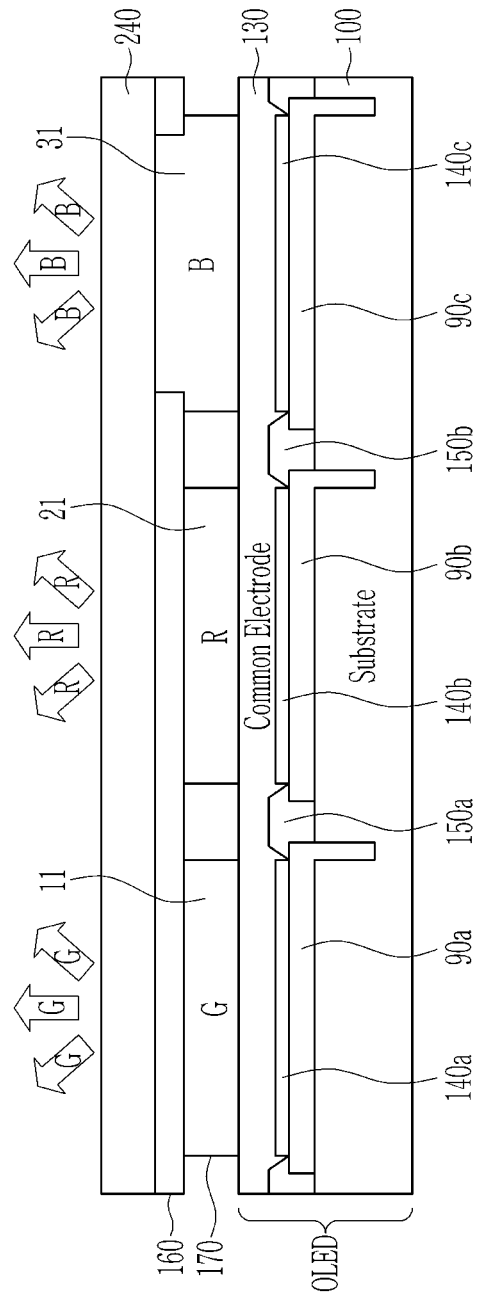
FIG. 4B is a schematic cross-sectional view of a display device according to an embodiment.

FIGS. 4A and 4B are schematic cross-sectional views of display devices according to embodiments. Referring to FIGS. 4A and 4B, a light source includes an organic light emitting diode (OLED) emitting blue light. The organic light emitting diode OLED may include (at least two, for example, three or more) pixel electrodes 90a, 90b, 90c formed on a substrate 100, a pixel defining layer 150a, 150b formed between the adjacent pixel electrodes 90a, 90b, 90c, an organic light emitting layer 140a, 140b, 140c formed on the pixel electrodes 90a, 90b, 90c, and a common electrode (layer) 130 formed on the organic light emitting layer 140a, 140b, 140c. A thin film transistor and a substrate may be disposed under the organic light emitting diode (OLED).

A stacked structure including a quantum dot polymer composite pattern 170 (e.g., a section including red quantum dot and a section including green quantum dot) and a substrate may be disposed on the light source. The excitation light (e.g., blue light) emitted from the light source and incident upon the patterned sections may be converted into red and green light, respectively. The blue light emitted from the light source may pass through the third section of the patterned quantum dot polymer composite.

Over the second section 21 emitting red light, the first section 11 emitting green light, or a combination thereof, an optical element 160 may be disposed. The optical element may be an excitation light cut layer or a first optical filter layer, which cuts (e.g., reflects or absorbs) the excitation light (e.g., blue light, green light, or a combination thereof). In an embodiment, the excitation light may include blue light and green light, and a green light cut filter may be disposed over the third section (e.g., blue pixel). Details of the excitation light cut layer are the same as set forth for the first optical filter herein.

The device may be obtained by separately producing the aforementioned stacked structure and (e.g., blue light emitting) LED or OLED and then assembling the same. Alternatively, the display device may be obtained by forming a quantum dot polymer composite pattern directly on the LED or OLED.

The substrate may be a substrate including an insulating material. The substrate may include glass; various polymers such as polyester of polyethylene terephthalate (PET), or polyethylene naphthalate (PEN), polycarbonate, and polyacrylate; polysiloxane (e.g., polydimethylsiloxane (PDMS)); an inorganic material such as $Al_2O_3$ or ZnO; or a combination thereof, but is not limited thereto. A thickness of the substrate may be appropriately selected taking into consideration a substrate material but is not particularly limited. The substrate may have flexibility. The substrate may have a transmittance of greater than or equal to about 50%, greater than or equal to about 60%, greater than or equal to about 70%, greater than or equal to about 80%, or greater than or equal to about 90% for light emitted from the quantum dots.

A wire layer including a thin film transistor or the like is formed on the substrate. The wire layer may further include a gate line, a sustain voltage line, a gate insulating layer, a data line, a gate electrode, a source electrode, a drain electrode, a semiconductor layer, a protective layer, and the like. The detail structure of the wire layer may be verified according to an embodiment. The gate line and the sustain voltage line are electrically separated from each other, and the data line is insulated and crossing the gate line and the sustain voltage line. The gate electrode, the source electrode, and the drain electrode form a control terminal, an input terminal, and an output terminal of the thin film transistor, respectively. The drain electrode is electrically connected to the pixel electrode that will be described herein.

The pixel electrode may function as an anode of the display device. The pixel electrode may be formed of a transparent conductive material such as indium tin oxide (ITO) or indium zinc oxide (IZO). The pixel electrode may be formed of a material having a light-blocking properties such as gold (Au), platinum (Pt), nickel (Ni), tungsten (W), chromium (Cr), molybdenum (Mo), iron (Fe), cobalt (Co), copper (Cu), palladium (Pd), or titanium (Ti). The pixel electrode may have a two-layered structure in which the aforementioned transparent conductive material and the aforementioned material having light-blocking properties are stacked sequentially.

Between two adjacent pixel electrodes, a pixel define layer (PDL) may be overlapped with a terminal end of the pixel electrode to divide the pixel electrode into a pixel unit. The pixel define layer may be an insulation layer which may electrically block the at least two pixel electrodes.

The pixel define layer may cover a portion of the upper surface of the pixel electrode, and the remaining region of the pixel electrode not covered by the pixel define layer may provide an opening. An organic light emitting layer that will be described herein may be formed in the region defined by the opening.

The organic light emitting layer defines each pixel area by the aforementioned pixel electrode and pixel define layer. In other words, one pixel area may be defined as an area formed with one organic emission unit layer which is contacted with one pixel electrode divided by the pixel define layer. For example, in the display device according to an embodiment, the organic light emitting layer may be defined as a first pixel area, a second pixel area and a third pixel area, and each pixel area is spaced apart from each other leaving a predetermined interval by the pixel define layer.

In an embodiment, the organic light emitting layer may emit a third light belonging to a visible light region or belonging to an ultraviolet (UV) region. In other words, each of the first to the third pixel areas of the organic light emitting layer may emit a third light. In an embodiment, the third light may be a light having the highest energy in the visible light region, for example, may be blue light. When all pixel areas of the organic light emitting layer are configured to emit the same light, each pixel area of the organic light emitting layer may be all formed of the same or similar materials or may show, e.g., exhibit, the same or similar properties. Such a design of the light emitting layer may significantly simplify the processes in forming the organic light emitting layer, and therefore, a display device may be applied to, e.g., made by, large scale/large area processing. However, the organic light emitting layer according to an embodiment is not necessarily limited thereto, but the organic light emitting layer may be configured to emit at least two different lights.

The organic light emitting layer includes an organic emission unit layer in each pixel area, and each organic emission unit layer may further include an auxiliary layer (e.g., hole injection layer (HIL), hole transport layer (HTL), electron transport layer (ETL), etc.) besides the light emitting layer.

The common electrode may function as a cathode of the display device. The common electrode may be formed of a transparent conductive material such as indium tin oxide (ITO) or indium zinc oxide (IZO). The common electrode may be formed on the organic light emitting layer and may be integrated therewith.

A planarization layer or a passivation layer (not shown) may be formed on the common electrode. The planarization layer may include a (e.g., transparent) insulating material for ensuring electrical insulation with the common electrode.

In an embodiment, the display device may further include a lower substrate, a polarizer disposed under the lower substrate, and a liquid crystal layer disposed between the stacked structure and the lower substrate, and in the stacked structure, the light emitting layer may be disposed over a face of the liquid crystal layer. The display device may further include a polarizer between the liquid crystal layer and the light emitting layer. The light source may further include LED and if desired, a light guide panel.

Figure 5:
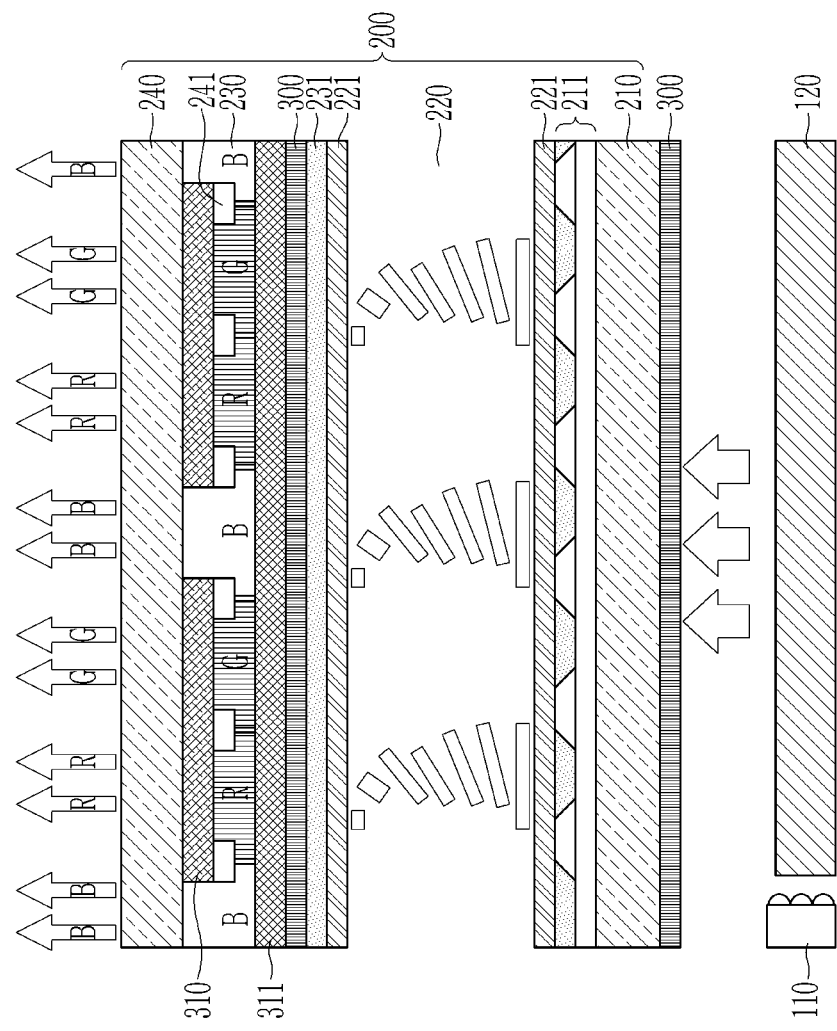
FIG. 5 is a schematic cross-sectional view of a display device according to an embodiment.

Non-limiting examples of the display device (e.g., a liquid crystal display device) according to an embodiment are illustrated with a reference to a drawing. FIG. 5 is a schematic cross-sectional view showing a liquid crystal display according to an embodiment. Referring to FIG. 5, the display device of an embodiment includes a liquid crystal panel 200, a polarizer 300 disposed under the liquid crystal panel 200, and a backlight unit (BLU) disposed under the polarizer 300.

The liquid crystal panel 200 includes a lower substrate 210, a stacked structure, and a liquid crystal layer 220 disposed between the stacked structure and the lower substrate. The stacked structure includes a transparent substrate (or referred to as an upper substrate) 240 and a photoluminescent layer 230 including a pattern of a quantum dot polymer composite as described.

The lower substrate 210, also referred to as an array substrate, may be a transparent insulation material substrate. A wire plate 211 is provided on an upper surface of the lower substrate 210. The wire plate 211 may include a plurality of gate wires (not shown) and data wires (not shown) that define a pixel area, a thin film transistor disposed adjacent to a crossing region of gate wires and data wires, and a pixel electrode for each pixel area, but is not limited thereto. Details of such a wire plate are not particularly limited.

The liquid crystal layer 220 may be disposed on the wire plate 211. The liquid crystal panel 200 may include an alignment layer 221 on the layer 220 to initially align the liquid crystal material. Details (e.g., a liquid crystal material, an alignment layer material, a method of forming liquid crystal layer, a thickness of liquid crystal layer, or the like) of the liquid crystal material and the alignment layer are not particularly limited.

A lower polarizer 300 is provided under the lower substrate. Materials and structures of the polarizer 300 are not particularly limited. A backlight unit (e.g., emitting blue light) may be disposed under the polarizer 300. An upper optical element or an upper polarizer 300 may be provided between the liquid crystal layer 220 and the transparent substrate 240, but is not limited thereto. For example, the upper polarizer 300 may be disposed between the liquid crystal layer 220 and the light emitting layer 230. The polarizer may be any suitable polarizer that may be used in a liquid crystal display device. The polarizer may be TAC (triacetyl cellulose) having a thickness of less than or equal to about 200 μm, but is not limited thereto. In an embodiment, the upper optical element may be a coating that controls a refractive index without a polarization function.

The backlight unit includes a light source 110. The light source may emit blue light or white light. The light source may include a blue LED, a white LED, a white OLED, or a combination thereof, but is not limited thereto.

The backlight unit may further include a light guide panel 120. In an embodiment, the backlight unit may be an edge-type lighting. For example, the backlight unit may include a reflector (not shown), a light guide panel (not shown) provided on the reflector and providing a planar light source with the liquid crystal panel 200, a, e.g., at least one, optical sheet (not shown) on the light guide panel, for example, a diffusion plate, a prism sheet, and the like, or a combination thereof but is not limited thereto. The backlight unit may not include a light guide panel. In an embodiment, the backlight unit may be a direct lighting. For example, the backlight unit may have a reflector (not shown), and may have a plurality of fluorescent lamps disposed on the reflector at regular intervals, or may have an LED operating substrate on which a plurality of light emitting diodes may be disposed, a diffusion plate thereon, and optionally a, e.g., at least one, optical sheet. Details (e.g., each component of a light emitting diode, a fluorescent lamp, a light guide panel, various optical sheets, and a reflector) of such a backlight unit are not particularly limited.

A black matrix 241 is provided under the transparent substrate 240 and has openings and hides a gate line, a data line, and a thin film transistor of the wire plate on the lower substrate. For example, the black matrix 241 may have a lattice shape. The photoluminescent layer 230 is provided in the openings of the black matrix 241 and has a quantum dot-polymer composite pattern including a first section (R) configured to emit a first light (e.g., red light), a second section (G) configured to emit a second light (e.g., green light), and a third section (B) configured to emit/transmit, for example blue light. If desired, the photoluminescent layer may further include a, e.g., at least one, fourth section. The fourth section may include a quantum dot that emits light with different color from light emitted from the first to third sections (e.g., cyan, magenta, or yellow light).

In the photoluminescent layer 230, sections forming a pattern may be repeated corresponding to pixel areas formed on the lower substrate. A transparent common electrode 231 may be provided on the photoluminescent color filter layer. The third section (B) configured to emit/transmit blue light may be a transparent color filter that does not change a light emitting spectrum of the light source. Blue light emitted from the backlight unit may enter in a polarized state and may be emitted through the polarizer and the liquid crystal layer as it is. If desired, the third section may include a quantum dot emitting blue light.

If desired, the display device may further have a blue light blocking layer (blue cut filter) or a first optical filter layer

Figure 3:
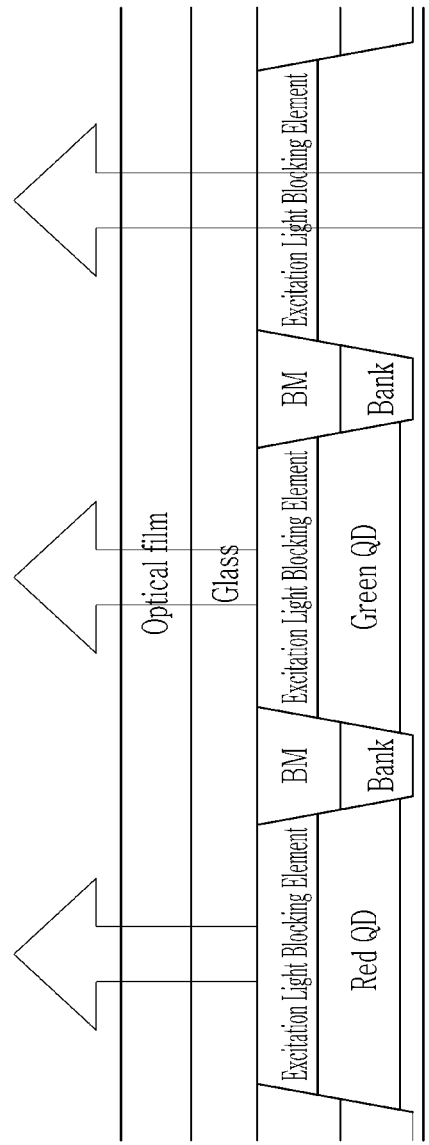
FIG. 3 is an exploded view of a display device according to an embodiment.

310. The blue light blocking layer may be disposed between lower surfaces of the first section (R) and the second section (G) and the upper substrate 240 or on the upper surface of the upper substrate. The blue light blocking layer may be a sheet having an opening in a region corresponding to a pixel area (a third section) displaying blue and thus may be formed in a region corresponding to the first and second sections. As shown in FIGS. 2A, 2B, and 3, the first optical filter layer may be integrally formed as one body structure at the remaining positions except positions overlapped with the third section, but is not limited thereto. At least two first optical filter layers may be spaced apart and be disposed on each of the positions overlapped with the first and the second sections. In an embodiment, the light source may include a green light emitting element and a green light cutting element may be disposed on the third section.

In an embodiment, the first optical filter layer may block light having a portion of a wavelength region in the visible light region and transmit light having other wavelength regions. In an embodiment, the first optical filter layer may block blue light (or green light) and transmit light except blue light (or green light). In an embodiment, the first optical filter layer may transmit green light, red light, and/or yellow light that is mixed light thereof.

In an embodiment, the first optical filter layer may substantially block the incident light and may transmit light in a desired wavelength region. In an embodiment, the first optical filter layer may have light transmittance of greater than or equal to about 70%, greater than or equal to about 80%, greater than or equal to about 90%, or even about 100% with respect to the light of the desired wavelength region.

In an embodiment, a first optical filter layer selectively transmitting red light may be disposed on the portion overlapped with the section emitting red light and the first optical filter layer selectively transmitting green light may be disposed on the portion overlapped with the section emitting green light, respectively. In an embodiment, the first optical filter layer may include a first region, a second region, or a combination thereof, wherein the first region blocks (e.g., absorb) blue light and red light and transmits light having a wavelength of a predetermined range (e.g., greater than or equal to about 500 nm, greater than or equal to about 510 nm, or greater than or equal to about 515 nm and less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm) and the second region blocks (e.g., absorb) blue light and green light and transmits light having a wavelength of a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm). In an embodiment, the light source may emit blue light and green light at the same time, and the first optical filter layer may include a third region which transmits selectively the blue light and blocks the green light The first region may be disposed at a place overlapped with the section emitting green light and the second region may be disposed at a place overlapped with the section emitting red light. The third region may be disposed at a place passing or emitting the blue light.

The first region, the second region, and if present the third region may be optically isolated. The first optical filter (layer) may contribute to improving color purity of a display device.

The display device may further include a second optical filter layer (e.g., a red/green or yellow light recycle layer) 311 disposed between the photoluminescent layer and the liquid crystal layer (e.g., the photoluminescent layer and the upper polarizing plate, e.g., polarizer), transmitting at least a portion of a third light (excitation light), and reflecting at least a portion of the first light, at least a portion of the second light, or at least a portion of each of the first light and second light. The first light may be red light, the second light may be green light, and the third light may be blue light. In an embodiment, the second optical filter layer may transmit only the third light (B) in a blue light wavelength region having a wavelength region of less than or equal to about 500 nm and light in a wavelength region of greater than about 500 nm, which is green light (G), yellow light, red light (R), or the like, may be not passed through the second optical filter layer and may be reflected. The reflected green light and red light may pass through the first and second sections and to be emitted to the outside of the display device.

The second optical filter layer or the first optical filter layer may be formed as an integrated layer having a relatively planar surface.

The first optical filter layer may include a polymer thin film including a dye absorbing light in a wavelength which is to be blocked, a pigment absorbing light in a wavelength which is to be blocked, or a combination thereof. The second optical filter layer and the first optical filter layer may include a single layer having a low refractive index, and may be, for example, a transparent thin film having a refractive index of less than or equal to about 1.4, less than or equal to about 1.3, or less than or equal to about 1.2. The second optical filter layer or the first optical filter layer having a low refractive index may be, for example, a porous silicon oxide, a porous organic material, a porous organic/inorganic composite, or a combination thereof.

The first optical filter layer or the second optical filter layer may include a plurality of layers having different refractive indexes. The first optical filter layer or the second optical filter layer may be formed by laminating two layers having different refractive indexes. For example, the first/second optical filter layer may be formed by alternately laminating a material having a high refractive index and a material having a low refractive index.

Hereinafter, the embodiments are illustrated in more detail with reference to examples. However, they are exemplary embodiments of the present invention, and the present invention is not limited thereto.

EXAMPLES

Analysis Methods
1. Ultraviolet-Visible (UV-Vis) Absorption Spectroscopy Analysis UV-Vis absorption spectroscopy analysis is performed, and a UV-Visible absorption spectrum and its first derivative are obtained, using an Agilent Cary 5000 spectrophotometer.
2. Photoluminescence Spectroscopy Analysis A photoluminescence (PL) spectrum of a produced core shell quantum dot at an excitation wavelength of 450 nanometers (nm) is obtained using a Hitachi F-7000 spectrophotometer.

3. Inductively Coupled Plasma (ICP) Analysis

An inductively coupled plasma-atomic emission spectroscopy (ICP-AES) analysis is performed using Shimadzu ICPS-8100.

4. Blue Light Absorption, Light Conversion Efficiency (CE), and Light Conversion of Composite The light amount (B) of blue excitation light is determined using an integral hemisphere of an absolute quantum efficiency measurement equipment (QE-2100, Otsuka). A Quantum Dot (QD) composite is positioned within the integrating sphere and then irradiated with blue excitation light (B) to measure a light dose (A) of green light emitted from the QD composite and a light dose (B') of blue light from (i.e., passed through) the QD composite.

The measured results are used to calculate a blue light absorption, a light conversion, and a light conversion efficiency in accordance with the following equations.

blue light absorption=$(B-B')/B$ light conversion=$A/B$ light conversion efficiency(CE)=$A/(B-B')$ 5. Photoluminescence Excitation (PLE) Analysis A PLE analysis is carried out using Hitachi F-7000 spectrophotometer.

The photoluminescence excitation (abbreviated PLE) is a specific type of photoluminescence. It is used in spectroscopic measurements in which the wavelength of the excitation light is varied, and the luminescence from the composite is monitored at the typical emission wavelength of the material in a predetermined wavelength range (e.g., about 510 nm to about 560 nm) being studied.

Reference Example 1

Zinc acetate and oleic acid are dissolved in 1-octadecene in a 250 milliliter (mL) reaction flask and then, heated at 120° C. under vacuum and cooled down to room temperature to obtain a zinc oleate solution.

To the reaction flask, indium acetate and lauric acid are added, and the mixture is heated at 120° C. under vacuum. After one hour, an atmosphere of the reaction flask is changed into nitrogen.

While a temperature in the reaction flask increases to 250° C., and a mixed solution of tris(trimethylsilyl)phosphine ((TMS)$_3$P) and trioctylphosphine is rapidly injected into the reaction flask, and the reaction is monitored by taking a small reaction sample from the reaction flask, and then an UV-Vis absorption spectrum is taken of the sample. The reaction is allowed to continue until the absorption spectrum reaches a target wavelength. When the reaction is complete, the reaction solution is rapidly cooled down to room temperature. Acetone is added to facilitate formation of a precipitate, the precipitate is separated with a centrifuge, and the isolated precipitate is dispersed in toluene to prepare a toluene dispersion of the core.

A mole ratio among indium, zinc, and phosphorous used in the preparation is 6:7:4.5. As confirmed by the absorption spectrum analysis, a size of the core is about 2.1 nm.

Reference Example 2

Preparation of First Quantum Dot Population (1) Selenium is dispersed in trioctylphosphine to prepare a Se/trioctylphosphine (TOP) stock solution, and sulfur is dispersed in trioctylphosphine to prepare a S/TOP stock solution.

Zinc acetate and oleic acid are dissolved in trioctylamine in a 2 liter (L) reaction flask, and the solution is vacuum-treated at 120° C. for 10 minutes. The reaction flask is filled with nitrogen (N$_2$), the solution is heated to 280° C. and then, cooled down to 100° C. The toluene dispersion of the core prepared according to Reference Example 1 is added to the reaction flask, and the Se/TOP stock solution and dodecanethiol are injected at intervals several times into the reaction flask as the flask temperature is maintained at a reaction temperature of about 280° C. The resulting reaction solution includes particles including the InZnP core and a ZnSeS shell disposed on the core. A total reaction time is about 30 minutes. In the preparation, a total amount of the Se and a total amount of the dodecanethiol (DDT) as used are 7 moles and 2 moles, respectively per one mole of indium.

Then, the S/TOP stock solution is injected into the reaction mixture to conduct a reaction at the reaction temperature to obtain a reaction solution that includes a core shell quantum dot having a ZnS-second shell on the ZnSeS first shell. A total reaction time is 60 minutes, and a total amount of the sulfur as used is about 6 moles per 1 mole of indium.

The reaction mixture is cooled to room temperature and an excess amount of ethanol is added to facilitate formation of the core shell quantum dot, which are then separated with a centrifuge. After the centrifugation, the supernatant is discarded and the precipitate is dried and then dispersed in toluene to obtain a toluene solution of quantum dot (hereinafter, a QD solution).

Figure 6A:
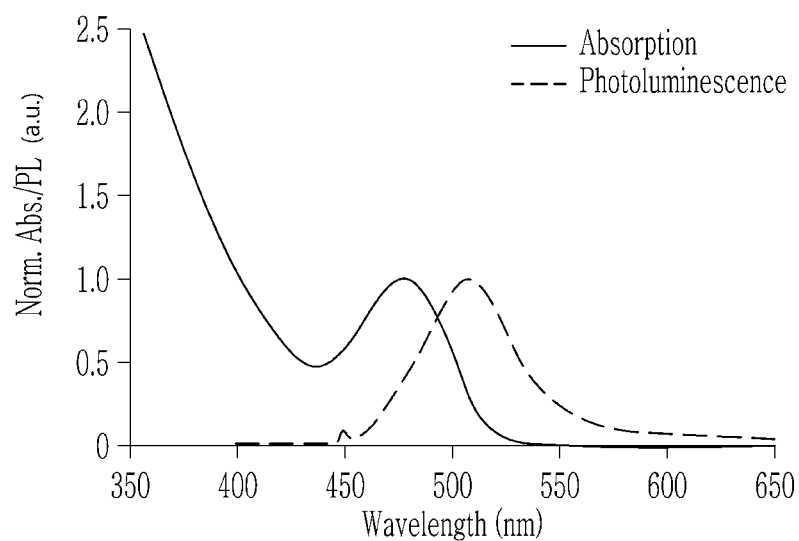
FIG. 6A is a graph of Normalized Absorption or Photoluminescence (a.u.) versus Wavelength (nm) of a UV-Vis absorption spectrum and a photoluminescent spectrum of the quantum dots ($1^{st}$ quantum dot population) of Reference Example 2.

(2) For the quantum dots thus obtained, a UV-Vis absorption spectroscopy analysis and a photoluminescent spectrum analysis are carried out and the results are shown in FIG. 6A. The quantum yield of the quantum dots in the solution is greater than or equal to about 90%. A particle size analysis is carried out for the QD population thus obtained and the results confirm that an average particle size of the QD population is about 4.5 nm and the QD population exhibits substantially a normal distribution.

Reference Example 3

Preparation of Second Quantum Dot Population (1) the quantum dots are prepared according to the same method as Example 2 except that based on 1 mole of indium, an amount of selenium (Se/TOP stock solution) is 21 moles, and dodecanethiol is not used during the first shell to form a ZnSe shell and an amount of sulfur per one mole of indium is about 3 moles.

Figure 6B:
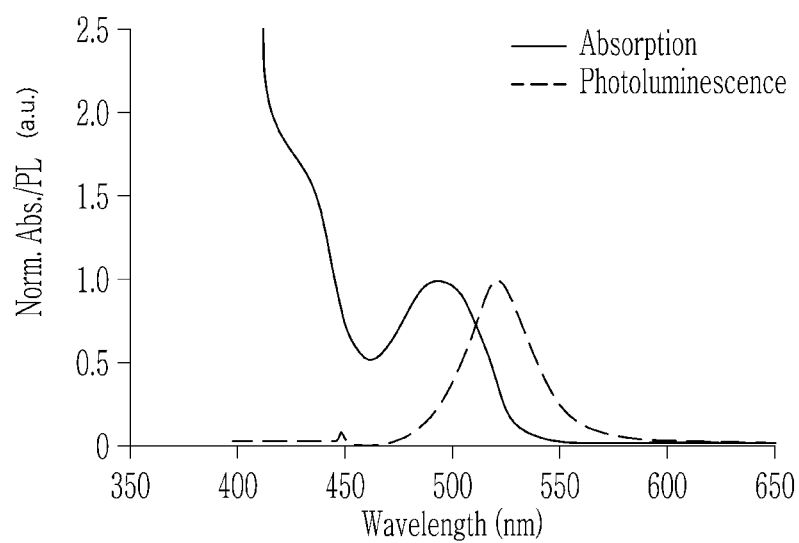
FIG. 6B is a graph of Normalized Absorption or Photoluminescence (a.u.) versus Wavelength (nm) of a UV-Vis absorption spectrum and a photoluminescent spectrum of the quantum dots ($2^{nd}$ quantum dot population) of Reference Example 3.

(2) For the quantum dots thus obtained, a UV-Vis absorption spectroscopy analysis and a photoluminescent spectrum analysis are carried out and the results are shown in FIG. 6B. The quantum yield of the quantum dots in the solution is greater than or equal to about 90%. A particle size analysis is carried out for the QD population thus obtained and the results confirm that an average particle size of the QD population is about 6.2 nm and the QD population exhibits substantially a normal distribution.

Example 1

Preparation of Quantum Dot Composite (1) A toluene solution of the first quantum dot population and a toluene solution of the second quantum dot population are mixed together at a quantum dot weight ratio of 75:25 to form a mixture including a plurality of quantum dots.

Figure 7:
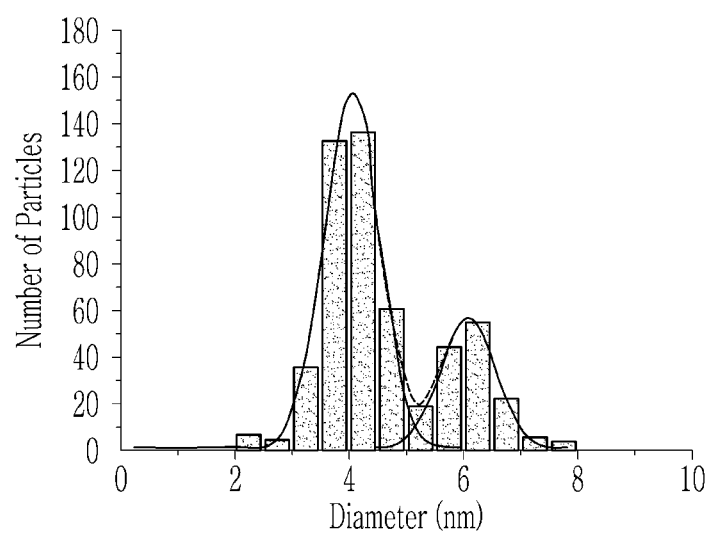
FIG. 7 is a graph of Number of Particles versus Diameter (nm) showing a size distribution of the plurality of the quantum dots (a mixture of the first quantum dots and the second quantum dots) included in a quantum dot composite of a color filter according to Example 1.

For the mixture as obtained, a transmission electron microscopy (TEM) analysis is carried out to measure a particle size distribution and the results are shown in FIG. 7. From the results of FIG. 7, the plurality of the quantum dots show a bimodal size distribution and the first peak particle size is about 4.5 nm and the second peak particle size is about 6.2 nm. The ratio of the frequency (mode) of the second peak particle size to the frequency of the first peak particle size is about 0.43:1.

Figure 8A:
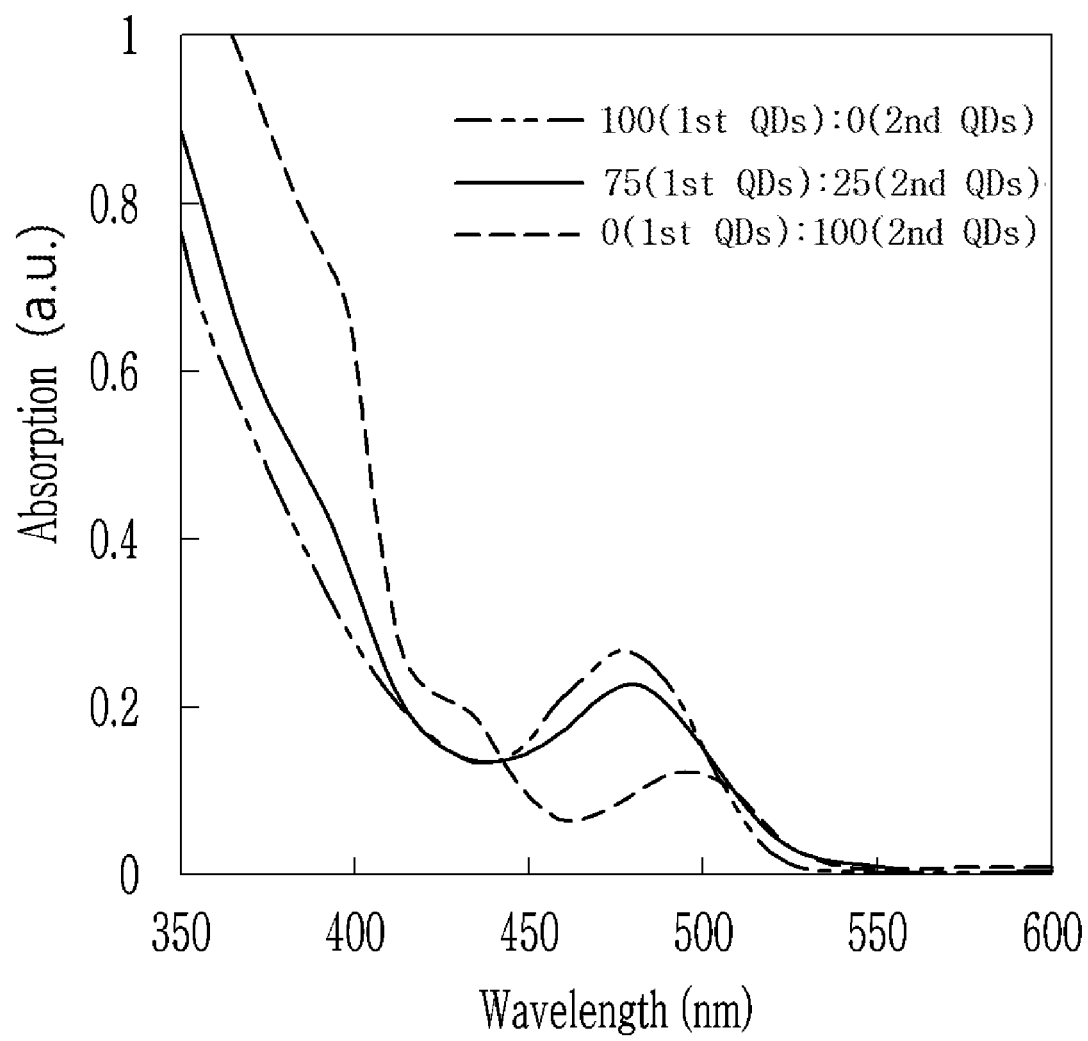
FIG. 8A is a graph of Absorption (a.u.) versus Wavelength (nm) showing UV-Vis absorption spectrums of the quantum dot composites of Example 1 ($1^{st}$ quantum dot (QD): $2^{nd}$ QD=75:25, wt:wt), and Comparative Example 1 ($1^{st}$ QD: $2^{nd}$ QD=100:0, wt:wt) and Comparative Example 2 ($1^{st}$ QD: $2^{nd}$ QD=0:100, wt:wt)

For the plurality of the quantum dots thus obtained, a UV-Vis absorption spectroscopy analysis is carried out and the results are shown in FIG. 8A. The results of FIG. 8A confirm that a differential coefficient of the plurality of the quantum dots at 450 nm is greater than zero (i.e., upward to the right).

(2) The toluene solution of the plurality of the quantum dots thus obtained (the mixture) is mixed with a binder (a quaternary copolymer of methacrylic acid, benzyl methacrylate, hydroxyethyl methacrylate, and styrene, and having an acid value of 130 milligrams of potassium hydroxide per gram (mg KOH/g), a molecular weight of 8,000 grams per mole, a methacrylic acid:benzyl methacrylate:hydroxyethyl methacrylate:styrene=61.5%:12%:16.3%:10.2%) as a solution (propylene glycol monomethyl ether acetate (PGMEA) at a concentration of 30 wt %) to prepare a quantum dot-binder dispersion.

The quantum dot binder dispersion is mixed with hexaacrylate having the following structure as a photopolymerizable monomer, glycoldi-3-mercaptopropionate (hereinafter, 2T), an oxime ester compound as an initiator, and $TiO_2$ as a light diffusing agent, and PGMEA to prepare a photosensitive composition.

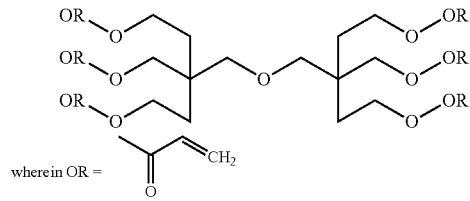

The prepared composition includes 42 weight percent (wt %) of the core shell quantum dots, 14.5 weight percent (wt %) of the binder polymer, 25 wt % of 2T, 15 wt % of the photopolymerizable monomer, 0.5 wt % of the initiator, and 3 wt % of the light diffusing agent based on a solid content of the composition, and a total solid content is 25 wt %.

The photosensitive composition is spin-coated on a glass substrate at 150 revolutions per minute (rpm) for 5 seconds to obtain films. The films are pre-baked (PRB) at 100° C.

The pre-baked films are exposed to irradiation of light (a wavelength: 365 nm, intensity: 100 millijoules (mJ)) for 1 second under a mask having a predetermined pattern (e.g., a square dot or a stripe pattern), and developed in a potassium hydroxide aqueous solution (concentration: 0.043 wt %) for 50 seconds to obtain quantum dot polymer composite patterns (a thickness: 10 um).

The obtained patterns are heat-treated (FOB) at 180° C. for 30 minutes under a nitrogen atmosphere.

Figure 8B:
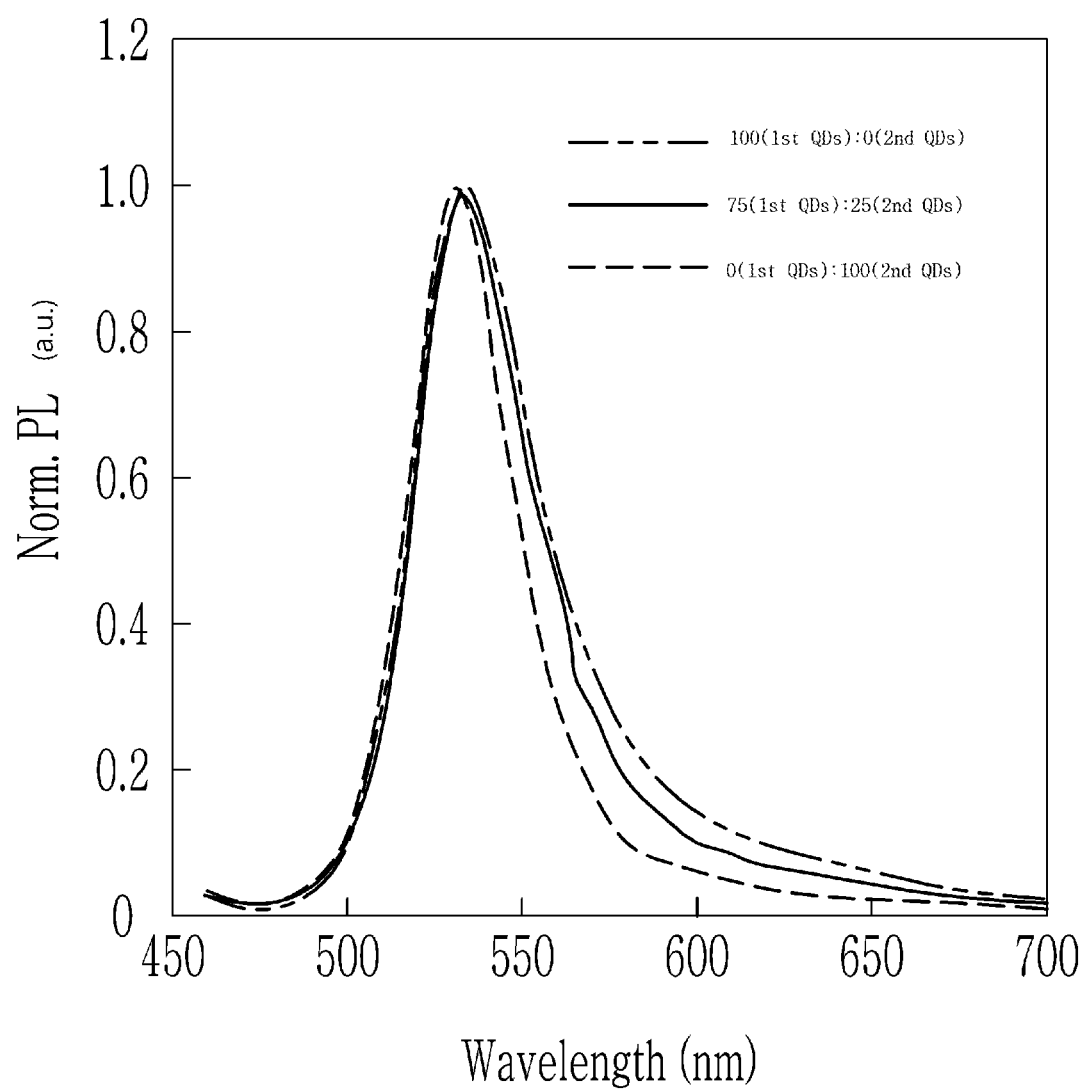
FIG. 8B is a graph of Normalized Photoluminescence (Norm. PL) (a.u.) versus Wavelength (nm) showing photoluminescent spectrums of the quantum dot composites of Example 1 ($1^{st}$ QD: $2^{nd}$ QD=75:25, wt:wt), and Comparative Example 1 ($1^{st}$ QD: $2^{nd}$ QD=100:0, wt:wt) and Comparative Example 2($1^{st}$ QD: $2^{nd}$ QD=0:100, wt:wt)

Optical Features of the obtained patterns are measured, and the results are shown in Table 1 and FIG. 8B.

The photoluminescent spectrum of the obtained pattern confirms that a photoluminescent tail percentage is about 14%.

Comparative Example 1

A quantum dot composite patterned film is obtained in the same manner as in Example 1 except that instead of the mixture, only the first quantum dot population is used.

For the first quantum dot population, a UV-Vis absorption spectroscopy analysis is carried out and the results are shown in FIG. 8A. The results of FIG. 8A confirm that a differential coefficient of the first quantum dot population at 450 nm is greater than zero (i.e., upward to the right).

Optical Features of the obtained patterns are measured, and the results are shown in Table 1 and FIG. 8B.

The photoluminescent spectrum of the obtained pattern confirms that a photoluminescent tail percentage is about 17%.

Comparative Example 2

A quantum dot composite patterned film is obtained in the same manner as in Example 1 except that except that instead of the mixture, only the second quantum dot population is used.

For the second quantum dot population, a UV-Vis absorption spectroscopy analysis is carried out and the results are shown in FIG. 8A. The results of FIG. 8A confirm that a differential coefficient of the second quantum dot population at 450 nm is downward to the right.

Optical Features of the obtained patterns are measured, and the results are shown in Table 1 and FIG. 8B.

TABLE 1

| | | Light conversion | Absorption | PL tail percentage | Full width at half maximum (FWHM) | Light conversion at 80° C. |
|---|---|---|---|---|---|---|
| Example 1 | First quantum dots:Second quantum dots = 75:25 | 35% | 92% | 14% | 40 nm | 32% |
| Comparative Example 1 | First quantum dots only | 35% | 94% | 17% | 43 nm | 31% |
| Comparative Example 2 | Second quantum dots only | 29% | 76% | 7% | 35 nm | 28% |

The results of Table 1 confirm that the quantum dot composite pattern of Example 1 show a combination of improved optical properties (e.g., a relatively high level of light conversion and a relatively high level of absorption) and may exhibit an improved stability in comparison with the comparative Examples.

FIG. 8B shows that the composite of Example 1 show a narrower FWHM together with a reduced tail portion than the composite of Comparative Example 1.

Example 2-1 and Example 2-2

A quantum dot composite patterned film is obtained in the same manner as in Example 1 except that a mixing ratio between the first quantum dot population and the second quantum dot population is 75:25 for Example 2-1 and 50:50 for Example 2-2, respectively, the following components are used to prepare a photosensitive composition, and a thickness of the film is 6 um:

The composition includes 43 wt % of the core shell quantum dots, 12.5 weight percent (wt %) of the binder polymer, 25 wt % of 2T, 15 wt % of the photopolymerizable monomer, 0.5 wt % of the initiator, and 4 wt % of the light diffusing agent based on a solid content of the composition, and a total solid content is 25%

Optical Features of the obtained patterns are measured, and the results are shown in Table 2.

Comparative Example 3 and Comparative Example 4

A quantum dot composite patterned film is obtained in the same manner as in Example 2-1 and 2-2 except that instead of the mixture of the first and second quantum dot populations, the first quantum dot population for Comparative Example 3 or the second quantum dot population for Comparative Example 4 is used, respectively.

Optical Features of the obtained patterns are measured, and the results are shown in Table 2.

TABLE 2

| | | Film properties (at excitation of 450 nm) | | | |
|---|---|---|---|---|---|
| | the quantum dots | Light conversion | Absorption | PL tail percentage | FWHM |
| Example 2-1 | First quantum dots:Second quantum dots = 75:25 | 31% | 92% | 15.8% | 40 nm |
| Example 2-2 | First quantum dots:Second quantum dots = 50:50 | 30.4% | 91% | 14.5% | 38 nm |
| Comparative Example 3 | First quantum dots only | 32% | 91% | 21.9% | 44 nm |
| Comparative Example 4 | Second quantum dots only | 29% | 87.1% | 11.8% | 35 nm |

The results of Table 2 confirm that the quantum dot composite patterns of Example 2-1 and Example 2-2 show a combination of improved optical properties (e.g., a relatively high level of light conversion and a relatively high level of absorption) at the use of incident light having a wavelength of 450 nm and may exhibit relatively reduced tail percentage and narrower FWHM than the composites of the comparative Examples.

Experimental Example 1

Figure 9A:
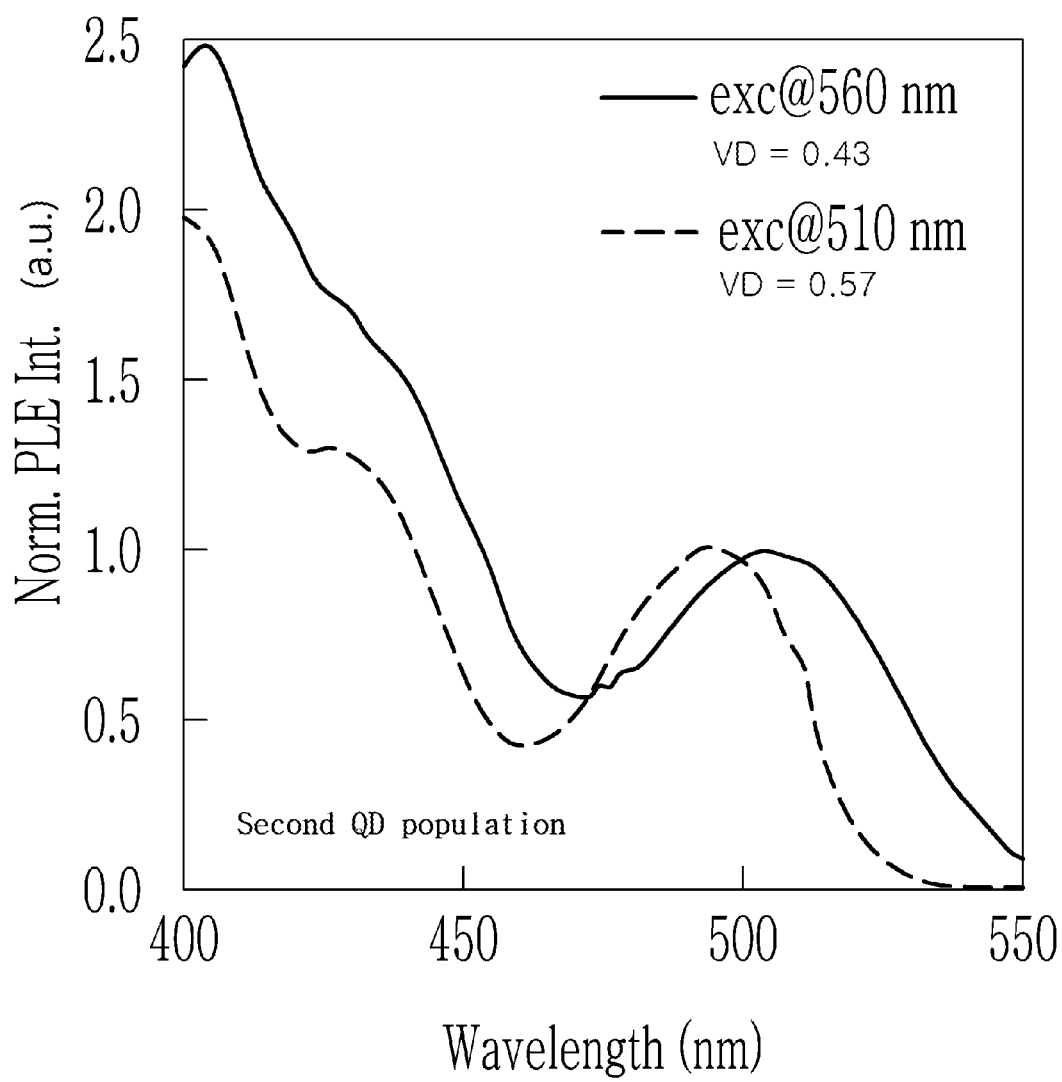
FIG. 9A is a graph of Normalized Photoluminescence Excitation Intensity (Norm. PLE Int.) (a.u.) versus Wavelength (nm) showing the results of a Photoluminescence Excitation (PLE) analysis for the quantum dot composite including the second quantum dot population only.
Figure 9B:
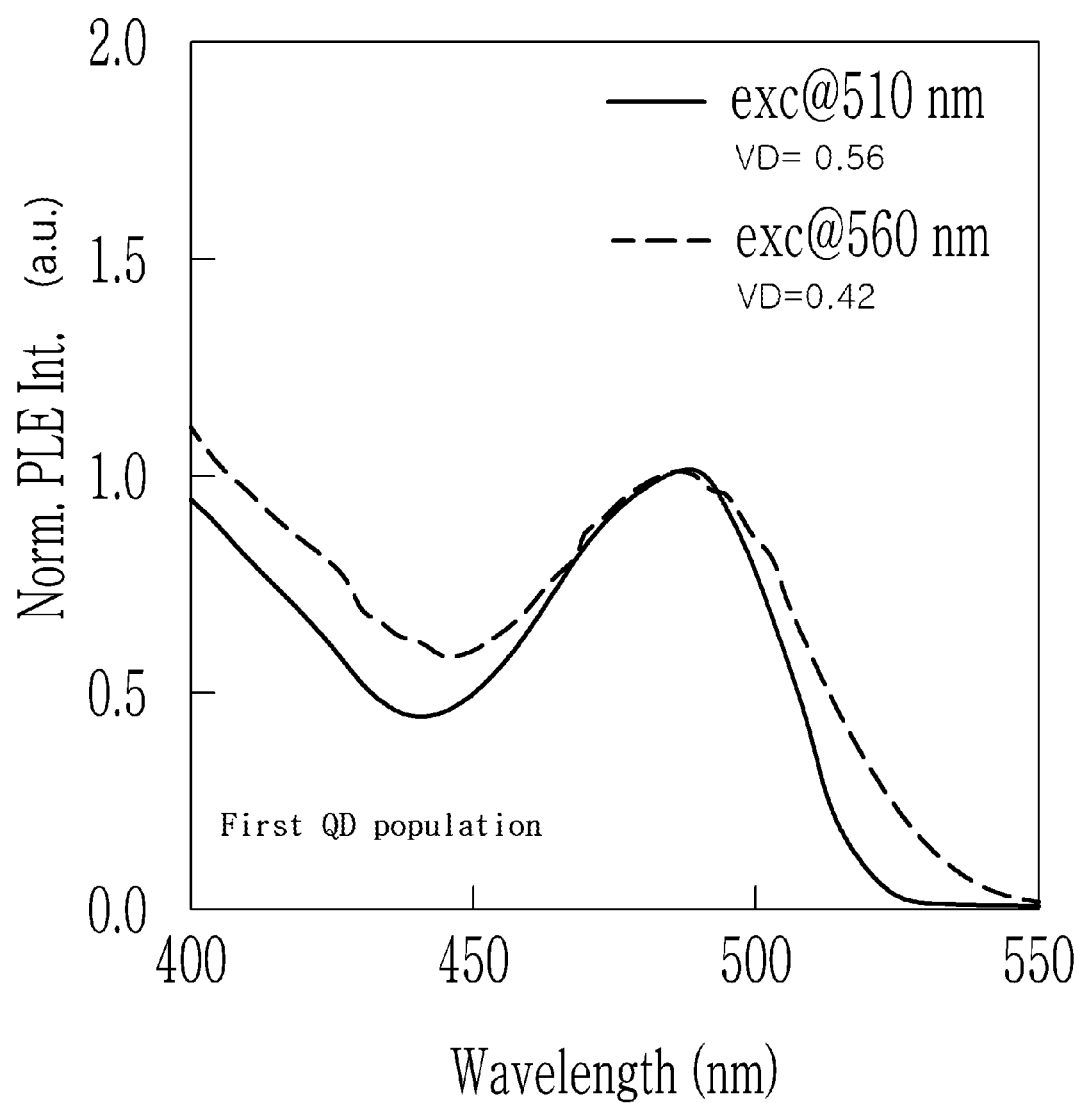
FIG. 9B is a graph of Normalized Photoluminescence Excitation Intensity (a.u.) versus Wavelength (nm) showing the results of a PLE analysis for the quantum dot composite including the first quantum dot population only.
Figure 9C:
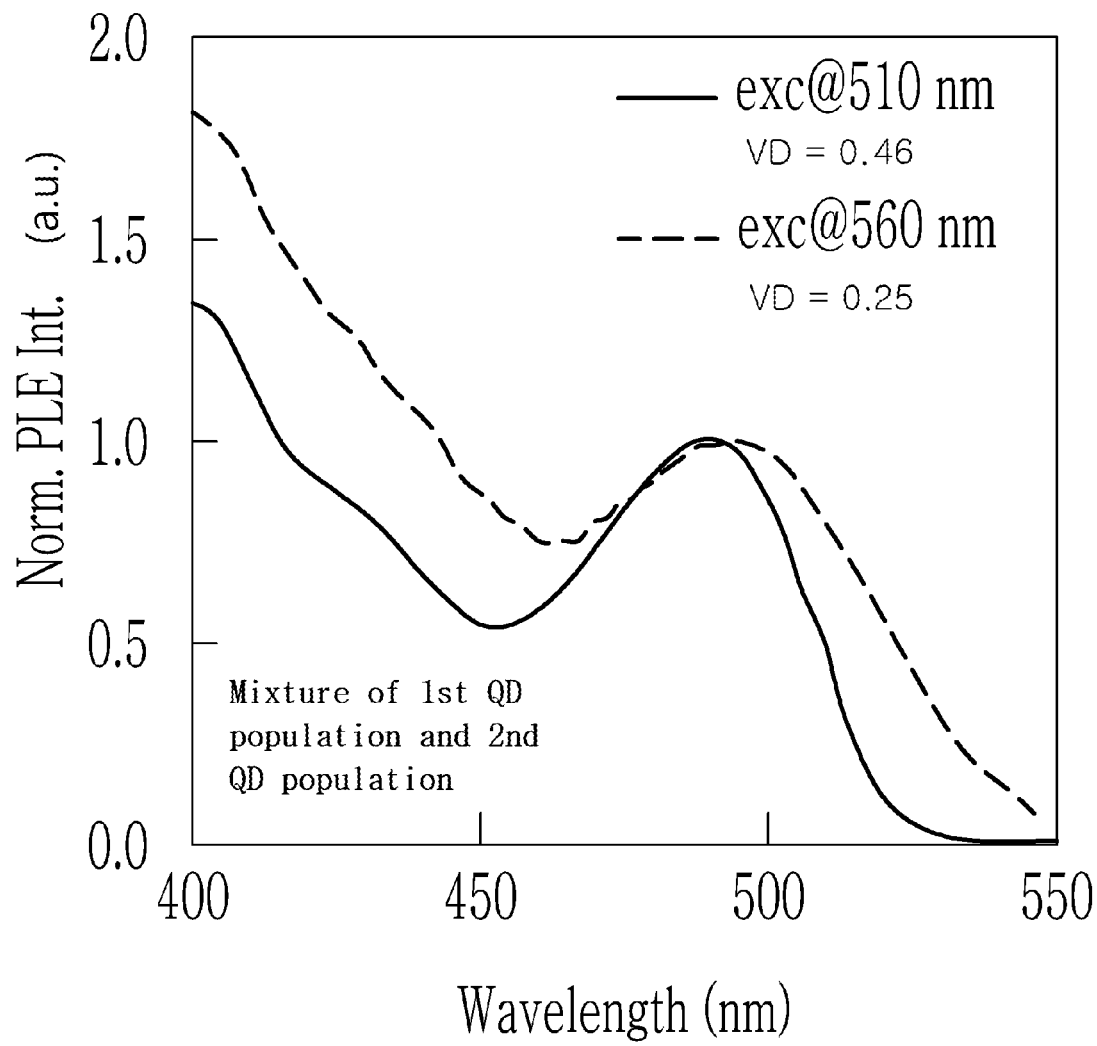
FIG. 9C is a graph of Normalized Photoluminescence Excitation Intensity (a.u.) versus Wavelength (nm) showing the results of a PLE analysis for the quantum dot composite of the mixture of the first and second quantum dot populations.

A quantum dot composite including the first quantum dot population, the second quantum dot population, or a mixture of the first quantum dot population with the second quantum dot population at a weight ratio of 75:25 is prepared, and for the composite, a PLE analysis is carried out and the results are shown in FIG. 9A, FIG. 9B, and FIG. 9C.

In the PLE analysis, the excitation (exc) light wavelength varies and for the emitted light, a normalized intensity is detected at 510 nm (which is 25 nm shorter than the luminescent peak wavelength) and at 560 nm (which is 25 nm longer than the luminescent peak wavelength), respectively.

The results confirm that in the case of the composite including the second quantum dot population only, in a normalized photoluminescence excitation intensity spectroscopy analysis of the composite, a difference between the peak valley depth at a detection wavelength of 510 nm and the peak valley depth at a detection wavelength of 560 nm is about 0.14.

The results confirm that in the case of the composite including the first quantum dot population only, in a normalized photoluminescence excitation intensity spectroscopy analysis of the composite, a difference between the peak valley depth at a detection wavelength of 510 nm and the peak valley depth at a detection wavelength of 560 nm is about 0.14.

In contrast, the results confirm that in the case of the composite including the mixture of the first quantum dot population and the second quantum dot population, in a normalized photoluminescence excitation intensity spectroscopy analysis of the composite, a difference between the peak valley depth at a detection wavelength of 510 nm and the peak valley depth at a detection wavelength of 560 nm is relatively high (e.g., about 0.21), in comparison with the composite including the first quantum dot population or the second quantum dot population only.

Without wishing to be bound by any theory, it is believed that in the composite including the mixture of the first and second quantum dot population, the re-absorption of light from the first quantum dots to the second quantum dots may increase, and thus in the PLE at 560 nm of the second quantum dots, the information about the $2^{nd}$ QDs having a contribution of the second quantum dots at 510 nm emission and the information about the fist QDs are reflected together, which causes a greater difference of the peak valley depth at the PLE.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:
1. A color filter comprising
a first color conversion region that is configured to emit a first light,
wherein the first color conversion region comprises a quantum dot composite,
wherein the quantum dot composite comprises
a matrix and a plurality of quantum dots dispersed in the matrix,
wherein the plurality of the quantum dots exhibit a multi-modal distribution comprising a first peak particle size and a second peak particle size in a size analysis,
wherein the second peak particle size is greater than the first peak particle size, and wherein a difference between the first peak particle size and the second peak particle size is less than about 5 nanometers, wherein the plurality of the quantum dots comprise first quantum dots, and second quantum dots different from the first quantum dots, wherein the first quantum dots comprise a semiconductor nanocrystal core comprising indium, phosphorus, and optionally zinc, a semiconductor nanocrystal shell disposed on the semiconductor nanocrystal core of the first quantum dots, the semiconductor nanocrystal shell of the first quantum dots comprising zinc, selenium, and sulfur, and wherein the second quantum dots comprise a semiconductor nanocrystal core comprising indium, phosphorus, and optionally zinc, a semiconductor nanocrystal shell disposed on the semiconductor nanocrystal core of the second quantum dots, the semiconductor nanocrystal shell of the second quantum dots comprising zinc, and selenium.

2. The color filter of claim 1, wherein the quantum dot composite is configured to emit green light.

3. The color filter of claim 1, wherein the plurality of the quantum dots have a photoluminescent peak wavelength of greater than or equal to about 490 nanometers and less than or equal to about 580 nanometers.

4. The color filter of claim 1, wherein an ultraviolet-visible absorption spectrum curve of the quantum dot composite exhibits a positive differential coefficient value at 450 nanometers.

5. The color filter of claim 4, wherein the differential coefficient value is greater than or equal to about 0.001.

6. The color filter of claim 1, wherein in an ultraviolet-visible absorption spectrum curve, the quantum dot composite exhibit a valley depth defined by the following equation of greater than or equal to about 0.2:

$$1-(Abs_{valley}/Abs_{first})=VD$$

wherein, $Abs_{first}$ is an absorption at a first absorption peak, and $Abs_{valley}$ is an absorption at a lowest point of a valley adjacent to the first absorption peak.

7. The color filter of claim 1, wherein a difference between the first peak particle size and the second peak particle size is greater than or equal to about 0.5 nanometers.

8. The color filter of claim 1, wherein the first peak particle size is greater than or equal to about 3.5 nanometers.

9. The color filter of claim 1, wherein the second peak particle size is greater than or equal to about 5 nanometers.

10. The color filter of claim 1, wherein a ratio of a frequency value of the second peak particle size to a frequency value of the first peak particle size is greater than or equal to about 0.1:1.

11. The color filter of claim 1, wherein the quantum dot composite is configured to exhibit a photoconversion of greater than or equal to about 30% upon excitation with light having a wavelength of about 450 nanometers.

12. The color filter of claim 1, wherein the quantum dot composite is configured to exhibit a light absorption for an incident light having a wavelength of about 465 nanometers of greater than or equal to about 80%.

13. The color filter of claim 1, wherein the quantum dot composite is configured to exhibit a light absorption for an incident light having a wavelength of about 450 nanometers of greater than or equal to about 87.5%.

14. The color filter of claim 1, wherein a photoluminescent peak of the quantum dot composite has a full width at half maximum of less than or equal to about 43 nanometers.

15. The color filter of claim 1, wherein the quantum dot composite is configured to emit a green light when irradiated with incident light having a wavelength of about 465 nanometers or a wavelength of about 450 nanometers, and wherein the green light has a luminescent peak with a tail percentage of less than or equal to about 16%.

16. The color filter of claim 1, wherein in a photoluminescence excitation spectroscopy analysis of the quantum dot composite, a difference between a first peak valley depth of a photoluminescent excitation spectrum at a wavelength of about 560 nanometers and a first peak valley depth of a photoluminescent excitation spectrum at a wavelength of about 510 nanometers is greater than or equal to about 0.15.

17. The color filter of claim 1, wherein in a photoluminescence excitation spectroscopy analysis of the quantum dot composite, a difference between a first peak valley depth of a photoluminescent excitation spectrum at a wavelength of about 560 nanometers and a first peak valley depth of a photoluminescent excitation spectrum at a wavelength of about 510 nanometers is greater than or equal to about 0.8.

18. The color filter of claim 1, wherein the matrix comprises a linear polymer, a crosslinked polymer, or a combination thereof.

19. A display device comprising a color filter of claim 1.

* * * * *